United States Patent
Matthews et al.

(10) Patent No.: US 9,057,583 B2
(45) Date of Patent: Jun. 16, 2015

(54) SIGHT SYSTEM

(75) Inventors: John W. Matthews, Newport Beach, CA (US); John McCrickerd, Costa Mesa, CA (US); Mark Buczek, Oceanside, CA (US); Mark Squire, San Diego, CA (US)

(73) Assignee: SureFire, LLC, Fountain Valley, CA (US)

(*) Notice: Subject to any disclaimer, the term of this patent is extended or adjusted under 35 U.S.C. 154(b) by 165 days.

(21) Appl. No.: 13/281,166

(22) Filed: Oct. 25, 2011

(65) Prior Publication Data

US 2012/0106170 A1    May 3, 2012

Related U.S. Application Data

(63) Continuation-in-part of application No. 12/914,597, filed on Oct. 28, 2010, now Pat. No. 8,474,173.

(51) Int. Cl.
*F41G 1/30* (2006.01)
*F41G 1/38* (2006.01)
(Continued)

(52) U.S. Cl.
CPC .. *F41G 1/30* (2013.01); *F41G 1/38* (2013.01); *G02B 7/004* (2013.01); *G02B 23/10* (2013.01)

(58) Field of Classification Search
CPC ............. F41G 3/06; F41G 3/08; F41G 3/142; F41G 3/165; F41G 3/326; F41G 1/38; F41G 1/35; F41G 1/473; F41G 11/003; F41G 1/46; F41G 1/00; F41G 1/34; F41G 3/16; F41G 1/345; F41G 1/387; F41G 1/30; F41G 1/467; F41G 3/065; F41G 1/32; F41G 11/001; F41G 11/007; F41G 1/065; F41G 1/14; F41G 1/18; F21C 27/00; F21C 33/0254; G02B 23/10; G02B 2027/0132; G02B 2027/0136; G02B 2027/0159; G02B 21/18; G02B 21/241; G02B 27/0101; G02B 27/0172; G02B 27/024; G02B 27/2228; G02B 6/0016; G02B 6/0038; G02B 7/12

USPC ........... 42/113, 117, 122, 123, 130, 132, 133, 42/140; 359/629–633
See application file for complete search history.

(56) References Cited

U.S. PATENT DOCUMENTS 3,230,627 A * 1/1966 Rickert et al. ................ 356/247
3,645,635 A    2/1972 Steck
(Continued)

FOREIGN PATENT DOCUMENTS

DE    202007010552    10/2007
DE    102009056208    7/2010
(Continued)

OTHER PUBLICATIONS

American Rifleman, Burns Eliminator Laserscope, Aug. 2011, pp. 86-87.
(Continued)

*Primary Examiner* — Troy Chambers
*Assistant Examiner* — Bridget Cochran
(74) *Attorney, Agent, or Firm* — Haynes and Boone, LLP

(57) ABSTRACT

A sight system is provided which may be selectively used in a variety of different ways. In one example, the sight system may be positioned on a rifle to provide a rifle sight system. In this example, the sight system may be positioned on the rifle barrel a substantial distance away from a user's eye. Advantageously, such an implementation may permit a user to effectively sight the rifle without compromising situational awareness. In another example, the sight system may be used to provide a telescopic sight with a reticle (e.g., a dot, crosshair, mark, or other appropriate shape) superimposed on an image (e.g., a zoomed or non-zoomed image) displayed from a camera. In another example, the sight system may be used to provide an occluded sight in which a camera and/or display of the sight system is disabled. As a result, a reticle may be displayed over an opaque background.

22 Claims, 34 Drawing Sheets

(51) Int. Cl.
*G02B 7/00* (2006.01)
*G02B 23/10* (2006.01)

(56) References Cited

U.S. PATENT DOCUMENTS

| | | | |
|---|---|---|---|
| 3,994,597 A | | 11/1976 | Calder et al. |
| 4,057,318 A | | 11/1977 | Schindl |
| 4,483,598 A | | 11/1984 | Leightner et al. |
| 4,531,052 A | * | 7/1985 | Moore ............ 235/404 |
| 4,806,007 A | | 2/1989 | Bindon |
| 5,140,151 A | | 8/1992 | Weiner et al. |
| 5,534,696 A | * | 7/1996 | Johansson et al. ............ 250/330 |
| 5,924,234 A | * | 7/1999 | Bindon et al. ................ 42/123 |
| 6,487,809 B1 | | 12/2002 | Gaber |
| 6,490,060 B1 | | 12/2002 | Tai et al. |
| 7,069,685 B2 | | 7/2006 | Houde-Walter |
| 7,319,557 B2 | * | 1/2008 | Tai ................ 359/399 |
| 7,325,354 B2 | | 2/2008 | Grauslys et al. |
| 7,421,816 B2 | | 9/2008 | Conescu |
| 7,656,579 B1 | | 2/2010 | Millett |
| 7,721,481 B2 | | 5/2010 | Houde-Walter |
| 7,764,431 B2 | * | 7/2010 | Domjan et al. ............. 359/630 |
| 7,796,329 B2 | | 9/2010 | Dobschal et al. |
| 7,866,247 B2 | | 1/2011 | Son et al. |
| 2005/0057808 A1 | | 3/2005 | Houde-Walter |
| 2005/0219690 A1 | * | 10/2005 | Lin et al. ............ 359/429 |
| 2006/0010761 A1 | | 1/2006 | Staley |
| 2006/0230665 A1 | | 10/2006 | Narcy et al. |
| 2008/0163536 A1 | | 7/2008 | Koch et al. |
| 2010/0095578 A1 | | 4/2010 | Elpedes |
| 2012/0030985 A1 | * | 2/2012 | Mauricio et al. ............ 42/84 |
| 2012/0033195 A1 | * | 2/2012 | Tai ................ 356/4.01 |

FOREIGN PATENT DOCUMENTS

| | | |
|---|---|---|
| EP | 0 548 625 | 6/1993 |
| GB | 869627 | 5/1961 |
| GB | 1405122 | 9/1975 |
| GB | 1 579 796 | 11/1980 |
| GB | 2428929 | 2/2007 |
| WO | WO-2009/137860 | 11/2009 |

OTHER PUBLICATIONS

Schmidt-Pechan prism, http://en.wikipedia.org/wiki/Schmidt%E2%80%93Pechan_prism, Aug. 21, 2011, pp. 1-3.
msnbc.com, New device could improve marksmanship, http://www.msnbc.msn.com/id/34384750/ns/technology_and_science-innovation/, pp. 1-2, Dec. 11, 2009.
Texas Instruments DLP in the Optoma Pico-Projector, Technology Insider, http://chipworks.com/blogs.aspx?id=5618&blogid=86, pp. 1-2, Jan. 12, 2009.
Reticle, http://en.wikipedia.org/wiki/Reticle, pp. 1-4, Jul. 22, 2009.
Reflex sight, http://en.wikipedia.org/wiki/Reflex_sight, pp. 1-4, Jul. 24, 2009.
Telescopic sight, http://en.wikipedia.org/wiki/Telescopic_sight, pp. 1-15, Oct. 18, 2011.
Advanced Combat Optical Gunsight, http://en.wikipedia.org/wiki/Advanced_Combat_Optical_Gunsight, pp. 1-3, May 15, 2010.
U.S. Appl. No. 12/785,781, title: Gun Sight, filing date: May 24, 2010, inventors: Matthews et al., 53 pages.
U.S. Appl. No. 12/914,597, title: Sight System, filing date: Oct. 28, 2010, inventors: Matthews et al., 50 pages.
U.S. Appl. No. 13/359,925, title: Gun Sight, filing date: Jan. 27, 2012, inventors: Matthews et al., 53 pages.
Brownells: "AR-332 Prism Sight", Jan. 1, 2012, http://www.brownells.com/.aspx/pid=31976/Product/AR-332-Prism-Sight, retrieved Jan. 20, 2012.
Burris Company: "AR-332 Prism Sight", Sep. 21, 2010, http://webarchive.org/web/20100921180853/http://www.burristactical.com/ar332.html, retrieved Jan. 20, 2012.
Brownells: "AR-332 Prism Sight", Jan. 1, 2012, http://www.brownells.com/aspx/pid=31976/Product/AR-332-Prism-Sight, retrieved Jan. 20, 2012.

* cited by examiner

SIGHT SYSTEM

CROSS-REFERENCE TO RELATED APPLICATIONS

This patent application is a continuation-in-part of U.S. patent application Ser. No. 12/914,597 filed Oct. 28, 2010, which is incorporated herein by reference in its entirety.

BACKGROUND

1. Technical Field

The present disclosure generally relates to sighting devices and more particularly to sight systems that generate a beam of light that enters a user's eye to produce a luminous reticle such as a dot or mark that is utilized for aiming small arms or other devices.

2. Related Art

Various types of sighting devices have been developed to enable the user of small arms such as handguns, rifles, shotguns, and submachine guns to aim these weapons. Each of these devices has its own advantages and disadvantages with respect to simplicity, ruggedness, size, weight, cost, accuracy, usability in different ambient light level, speed of use, maintenance of situational awareness, and efficacy in developing both reactive and precision shooting skills through both live fire and dry fire practice. Examples of such sighting devices include: open sights, telescopic sights, laser sights, "reflex" or "red dot" sights, night vision sights, and thermal or fused night/vision thermal sights.

One particular problem associated with conventional sighting devices is the loss of situational awareness experienced by users. For example, when aiming a weapon or other device using conventional sighting devices, a user is often forced to focus on a narrow field of view corresponding to a desired target or an immediate area near the target. Unfortunately, this narrow field of view may cause the user to lose situational awareness. Specifically, the user may be unaware of other events occurring outside a target area. In combat situations, such events may include the actions of adversaries or the existence of hostile environmental conditions. Thus, the user may be placed at high risk when using sighting devices which limit the user to only a narrow field of view.

Another problem associated with conventional sighting devices is a lack of flexibility. For example, users may be accustomed to using certain types of sighting devices such as telescopic sights or reflex sights. However, many existing sighting devices permit the user to use only a single sighting method. Moreover, if a user desires to change the method of sighting (e.g., to use different types of sights in different conditions), it may be cumbersome and impractical for the user to replace one type of sighting device for another type, especially in stressful or combat situations. As a result, users are often forced to adapt their skills to use a particular available type of sighting device, rather than the sighting device adapting to the user. Accordingly, there is a need for an improved sighting device.

SUMMARY

In accordance with various embodiments described herein, a sight system (e.g., also referred to as an aiming system) is provided which may be selectively used in a variety of different ways. For example, the sight system may be positioned on a rifle to provide a rifle sight system. In one embodiment, the sight system may be positioned on and substantially parallel to a rifle barrel. While positioned in this manner, the sight system may be located a substantial distance away from a user's eye. Advantageously, such an implementation may permit a user to effectively sight the rifle without blocking the user's peripheral vision and without compromising situational awareness.

In one embodiment, a sight system may be implemented with a camera and a display for providing video images to a user. The images may be continuously streamed to the display and/or other destinations to provide dynamic imaging of a target scene. The images may be provided to a user along with a red dot or other type of reticle (e.g., one or more dots, crosshairs, diamonds, chevrons, marks, or other appropriate shapes) to aid the user in sighting a rifle or other appropriate device. For example, the sight system may be used to provide a reflex sight with a red dot superimposed on an image displayed from a camera. As another example, the sight system may be used to provide a collimator sight (e.g., also referred to as a blind sight or an occluded sight) in which a camera and/or display of the sight system may be selectively disabled. As a result, a red dot may be displayed over an opaque background.

In one embodiment, a sight system may provide zoomed images on a display using, for example, optical zoom and/or digital zoom features (e.g., telescopic zoom features) of a camera and/or a processing block. As a result, images of a target scene may be magnified as desired by a user. By combining such zoom capabilities with reflex sight features, a single sight system may be used in place of separate red dot sight and zoom sight devices. As a result, the number of devices operated by the user may be reduced.

In one embodiment, a sight system includes a camera adapted to capture images of a target scene; and a projector comprising: a display adapted to present the images; a beam combiner adapted to pass the presented images to a user of the sight system; and a light source adapted to project a reticle to the beam combiner, wherein the beam combiner is adapted to reflect the reticle to the user.

In one embodiment, a method of operating a sight system includes capturing images of a target scene using a camera; selectively presenting the images on a display; passing any of the presented images through a beam combiner to a user of the sight system; projecting a reticle from a light source to the beam combiner; and reflecting the reticle from the beam combiner to the user.

In one embodiment, a sight system includes means for capturing images of a target scene; means for presenting the images; means for passing the presented images to a user of the sight system; means for projecting a reticle; and means for reflecting the reticle to the user.

In one embodiment, a sight system includes objective lens optics adapted to receive light from a scene; a prism adapted to receive the scene light from the objective lens optics to reinvert the scene light; a light source adapted to project additional light into the prism to superimpose a reticle on the scene light for viewing by a user; a shutter adapted to be adjusted to permit the user to selectively operate the sight system as a telescopic sight or an occluded sight; and an eyepiece adapted to collimate the additional light to provide the reticle and the scene light to an eye of the user.

In one embodiment, a method of operating a sight system includes receiving light from a scene at objective lens optics; passing the scene light from the objective lens optics through a prism to reinvert the scene light; projecting additional light from a light source into the prism to superimpose a reticle on the scene light for viewing by a user; collimating the additional light with an eyepiece to provide the reticle and the scene light to an eye of the user; and adjusting a shutter to permit the user to selectively operate the sight system as a telescopic sight or an occluded sight.

In one embodiment, a method of aligning a sight system includes positioning first and second telescopes on first and second ends of the sight system, wherein the first telescope is positioned to view objective lens optics of the sight system, wherein the second telescope is positioned to view an eyepiece of the sight system; projecting light from a light source of the sight system into a prism of the sight system; passing the light from the prism to the first and second ends of the sight system; aligning a position of the prism until the light from the first end is substantially aligned with the first telescope; and aligning a position of an eyepiece of the sight system until the light from the second end is substantially aligned with the second telescope.

In one embodiment, a sight system includes an optical system having an optical axis and adapted to receive light from a scene; an electronic display adapted to provide an image to the optical system; and wherein the optical system is adapted to pass the scene light and the image along the optical axis to superimpose the image on the scene for viewing by a user of the sight system.

In one embodiment, a method of operating a sight system includes receiving light from a scene at an optical system having an optical axis; providing an image from an electronic display to the optical system; and passing the scene light and the image through the optical system and along the optical axis to superimpose the image on the scene for viewing by a user of the sight system.

Advantageously, various embodiments further described herein may provide flexibility in the use and operation of sight systems. For example, users familiar with reflex sights or occluded sights may configure the sight system to emulate the operation of reflex or occluded sights as may be desired in particular applications.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
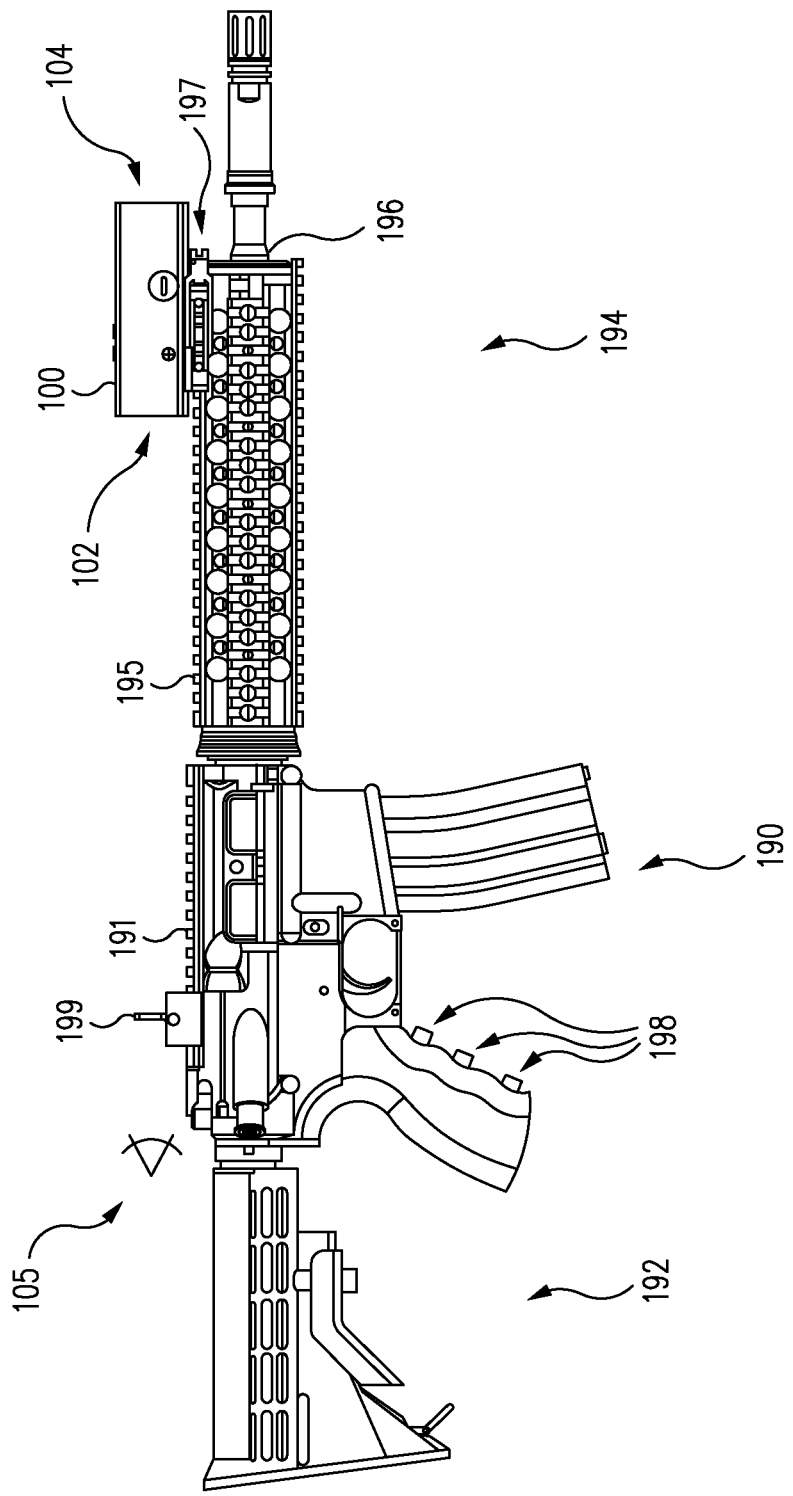
FIGS. 1A-C illustrate several views of a sight system including an integrated camera mounted on a rifle in accordance with various embodiments of the disclosure.
Figure 1B:
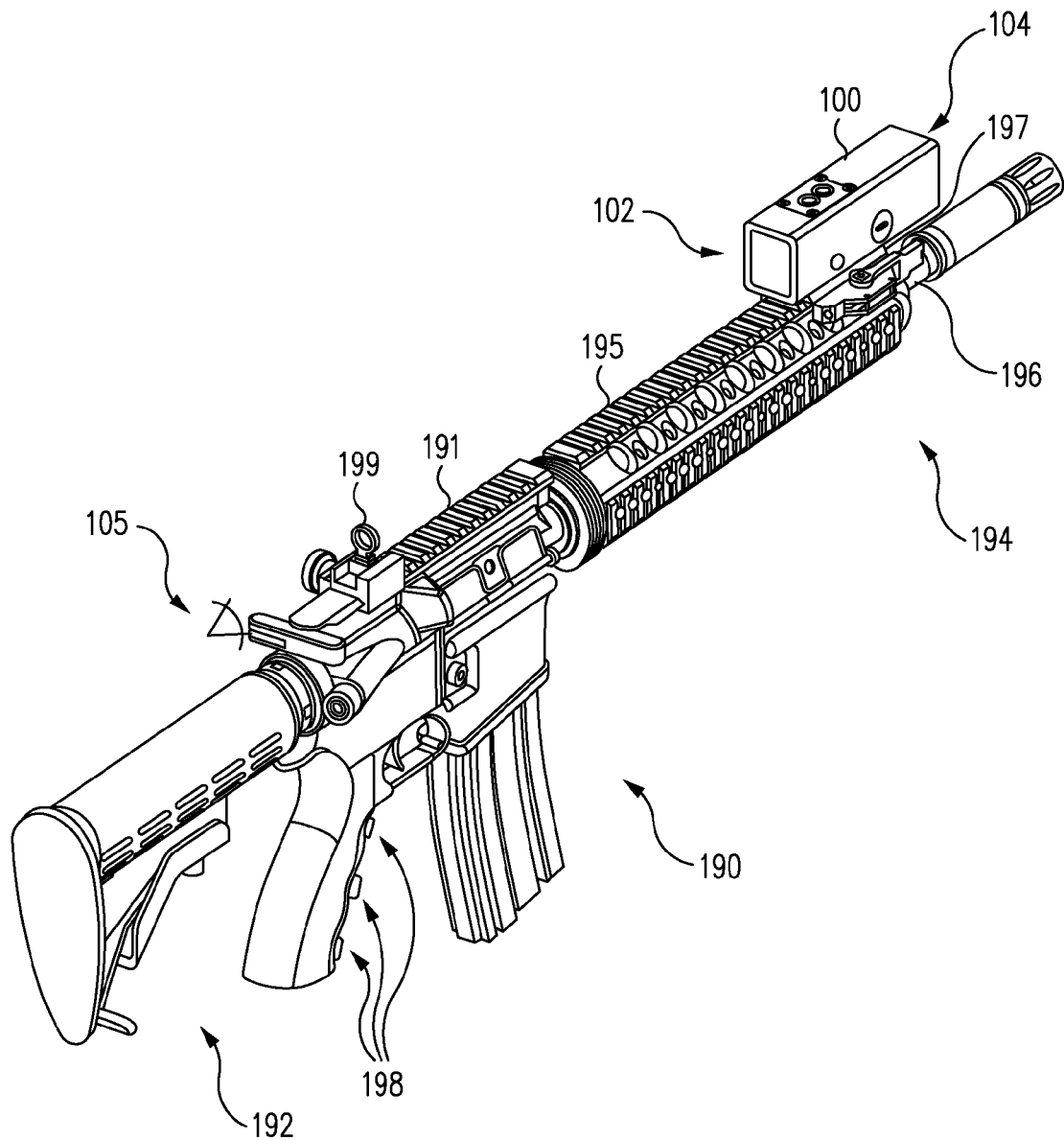
Figure 1C:
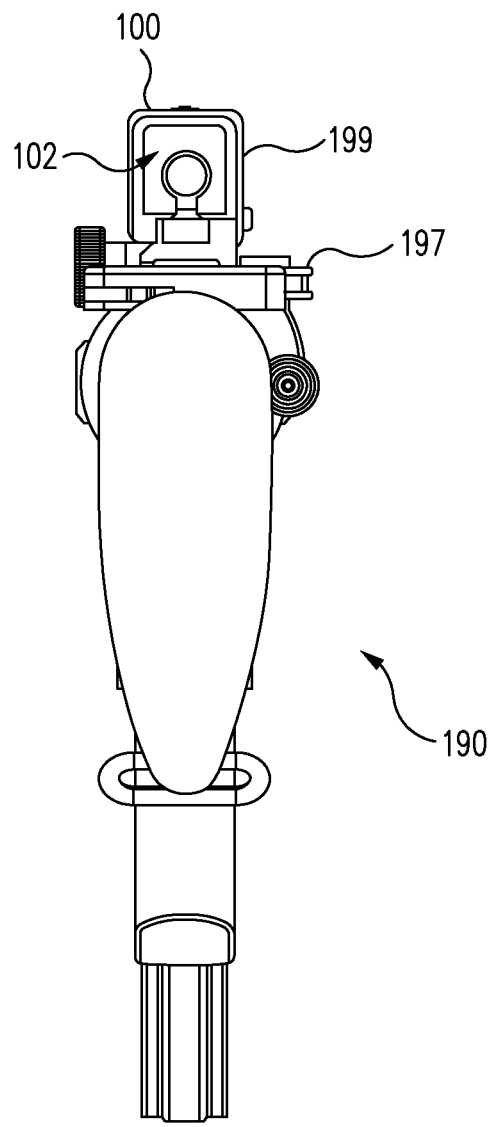

FIGS. 1A-C illustrate several views of a sight system 100 including an integrated camera mounted on a rifle 190 in accordance with various embodiments of the disclosure. When mounted on rifle 190, sight system 100 may be used as a rifle sight system. For example, in one embodiment, rifle 190 may be an M4 assault rifle as shown in FIGS. 1A-C.

In one embodiment, sight system 100 may be mounted on a rail 195, such as a Picatinny rail, using a rail clamp mount 197. In one embodiment, rail clamp mount 197 may be implemented as a rail clamp mount set forth in U.S. Pat. No. 7,712,242 entitled "RAIL CLAMP MOUNT" which is incorporated herein by reference in its entirety. Although sight system 100 is illustrated in FIGS. 1A-C as being mounted on top of rifle 190, other mounting configurations are also contemplated. For example, in another embodiment, sight system 100 may be mounted on a left or right side of rifle 190 using appropriate mount and/or rail structures (e.g., standard military rail structures or others).

In various embodiments, sight system 100 may be implemented with an integrated camera and projector. In this regard, light from a target scene may enter an end 104 of sight system 100 and may be captured by a camera and/or otherwise processed to provide images to a display of sight system 100. The images may be presented (e.g., displayed) on the display and selectively projected from an end 102 of sight system 100 toward a user 105 (e.g., illustrated by an eye corresponding to an approximate placement of a user's eye when operating sight system 100 in one embodiment). In various embodiments, such images may be zoomed images of a target scene provided by, for example, optical zoom and/or digital zoom features of a camera and/or a processing block of sight system 100.

Sight system 100 may also project a red dot or other type of reticle toward user 105. For example, in one embodiment, sight system 100 may project red light to provide a red dot that is superimposed over the images displayed by sight system 100. Sight system 100 may be implemented such that the position of the red dot relative to the images provided by the display of sight system 100 may be used to sight rifle 190.

Advantageously, sight system 100 may be selectively operated as a reflex sight and/or an occluded sight as may be desired by user 105. For example, images presented on the display of sight system 100 may be projected toward user 105 along with the red dot to permit sight system 100 to operate as a reflex sight. As another example, the red dot may be projected toward user 105 without images captured by the camera of sight system 100 to permit sight system 100 to operate as an occluded sight.

As shown in FIGS. 1A-C, an eye of user 105 may be positioned substantially near an end 192 of rifle 190 (e.g., near the typical location of a conventional rear sight), while sight system 100 is mounted near an end 194 of rifle 190 (e.g., near a barrel 196 of rifle 190). This configuration permits user 105 to use sight system 100 without compromising the user's peripheral vision or situational awareness. In this regard, when using sight system 100, user 105 looks substantially down barrel 196 of rifle 190 through an optional eyepiece 199 which may be mounted, for example, on a rail 191, such as a Picatinny rail, to permit an eye of user 105 to be conveniently positioned in line with end 102 of sight system 100. In contrast to conventional scopes or conventional sight systems, sight system 100 is mounted far away from optional eyepiece 199 near end 194 of rifle 190.

Thus, when sight system 100 is used to provide a reflex sight or an occluded sight, the far mounting of sight system 100 permits user 105 to retain situational awareness. Moreover, if user 105 keeps both eyes open when operating sight system 100 (e.g., when operating sight system 100 as an occluded sight or, if desired, when operating sight system 100 as a reflex sight), one of the user's eyes may receive a substantially unobstructed view of a target area. As a result, user 105 is more likely to be aware of peripheral events and/or other activity. Such events and/or activity may be present, for example, in the user's peripheral vision. In particular, when operating sight system 100 as a reflex sight, the far mounting of sight system 100 permits user 105 to retain a field of view that is not limited to images provided by sight system 100.

As also shown in FIGS. 1A-C, one or more user controls 198 may be mounted on rifle 190. For example, user controls 198 are shown mounted on a front surface of a pistol grip of rifle 190. However, other locations are also contemplated including, for example, other surfaces of the pistol grip and/or other surfaces of rifle 190.

Figure 2A:
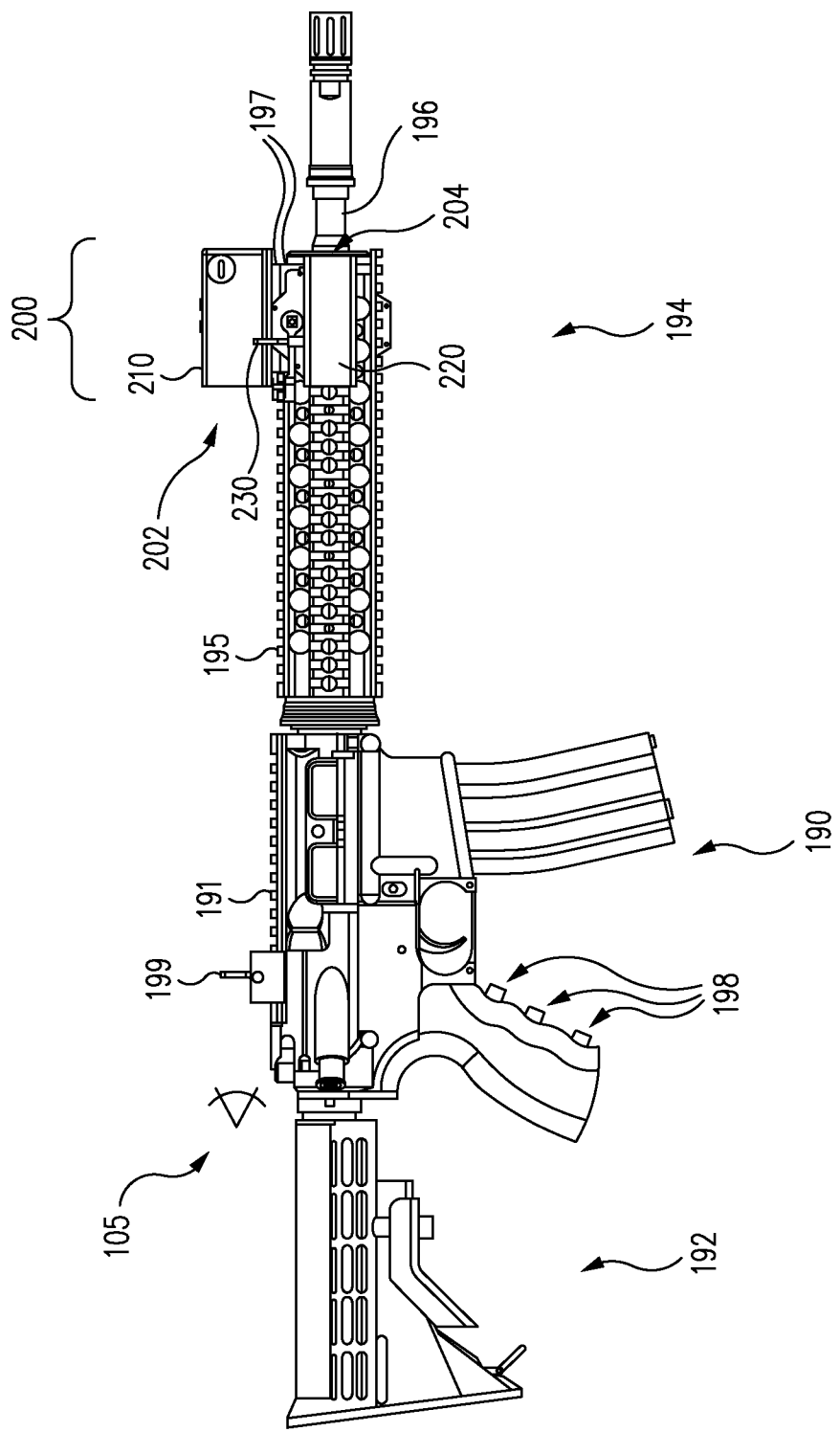
FIGS. 2A-C illustrate several views of a sight system including a projector and cameras mounted on a rifle in accordance with various embodiments of the disclosure.
Figure 2B:
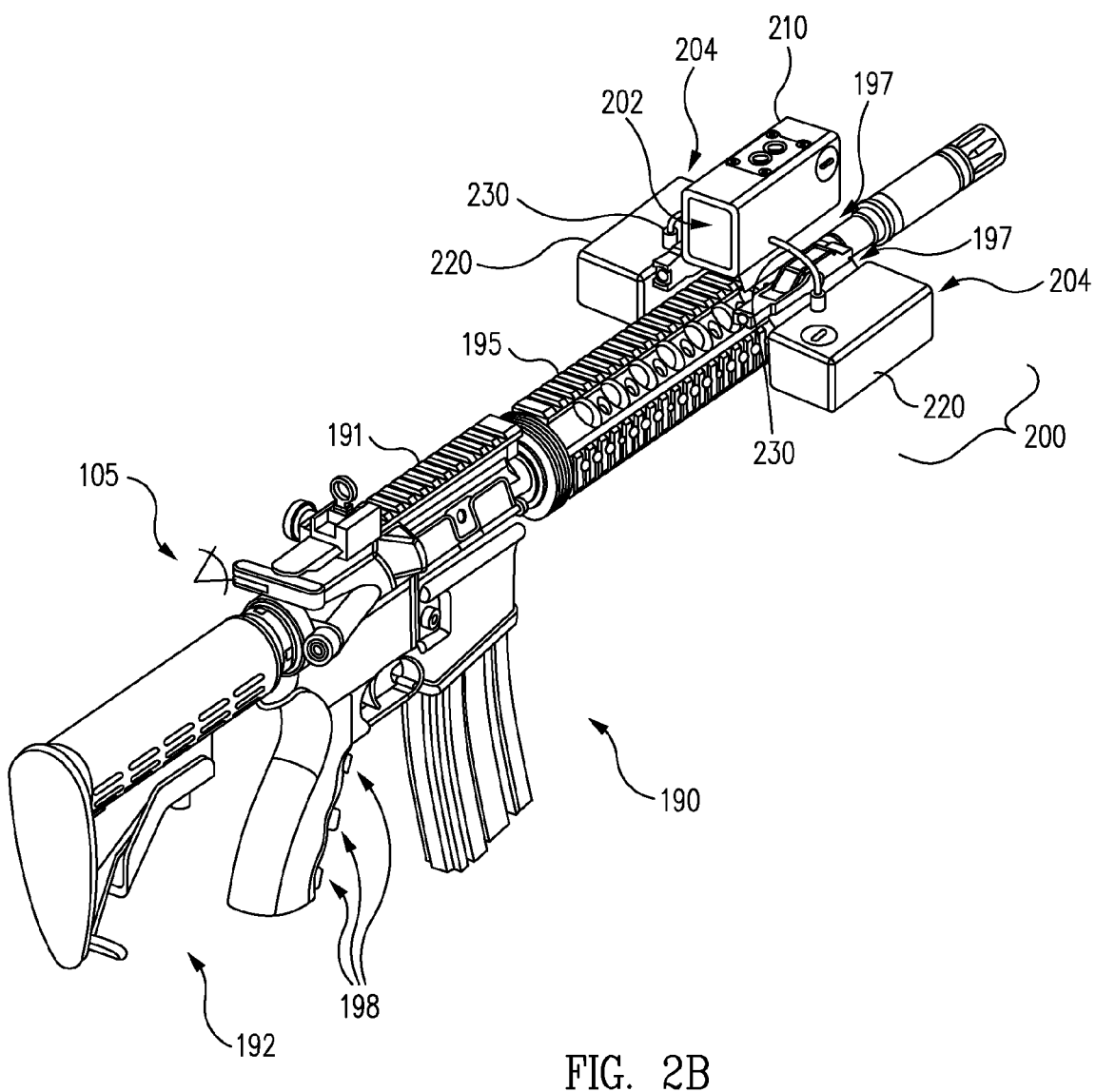
Figure 2C:
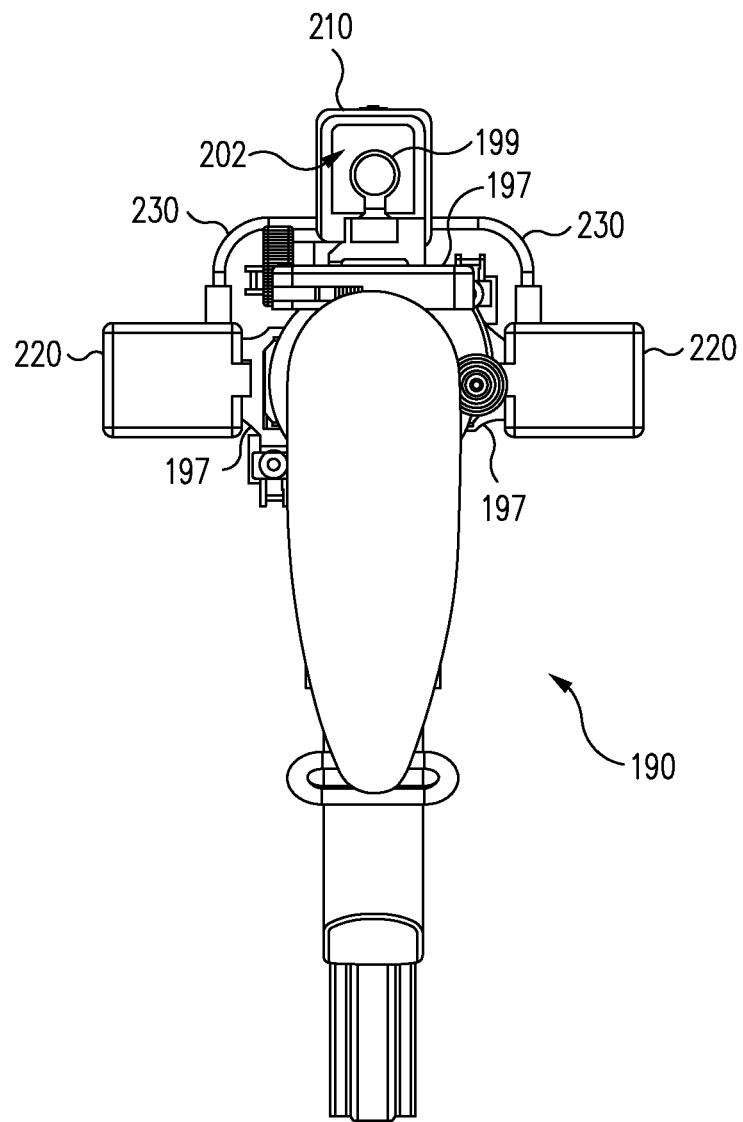

FIGS. 2A-C illustrate several views of a sight system 200 including a projector 210 and cameras 220 mounted on rifle 190 in accordance with various embodiments of the disclosure. In one embodiment, projector 210 and each of cameras 220 may be mounted on rifle 190 using one or more rail clamp mounts 197.

It will be appreciated that sight system 200 may be implemented in a similar fashion as sight system 100. In this regard, the various features described with regard to FIGS. 1A-C may be implemented in the embodiments shown in FIGS. 2A-C.

However, in contrast to sight system 100 of FIGS. 1A-C which may be implemented with an integrated camera and projector, sight system 200 of FIGS. 2A-C includes projector 210 and cameras 220 that are separate from each other. In this regard, light from a target scene may enter an end 204 of one or more of cameras 220 and may be captured by one or more of cameras 220 and/or otherwise processed to provide images. The images may be passed from cameras 220 to projector 210 through connections 230. The images may be received and/or further processed by projector 210 and then projected from an end 202 of projector 210 toward user 105.

Advantageously, the use of two cameras 220 can permit images from both of cameras 220 to be used by projector 210. For example, in one embodiment, wide images may be provided by combining images from cameras 220. In another embodiment, images from both of cameras 220 may be used for parallax correction (e.g., rangefinding) and/or focusing of cameras 220 using any of the optics and/or processing blocks described herein.

Figure 3:
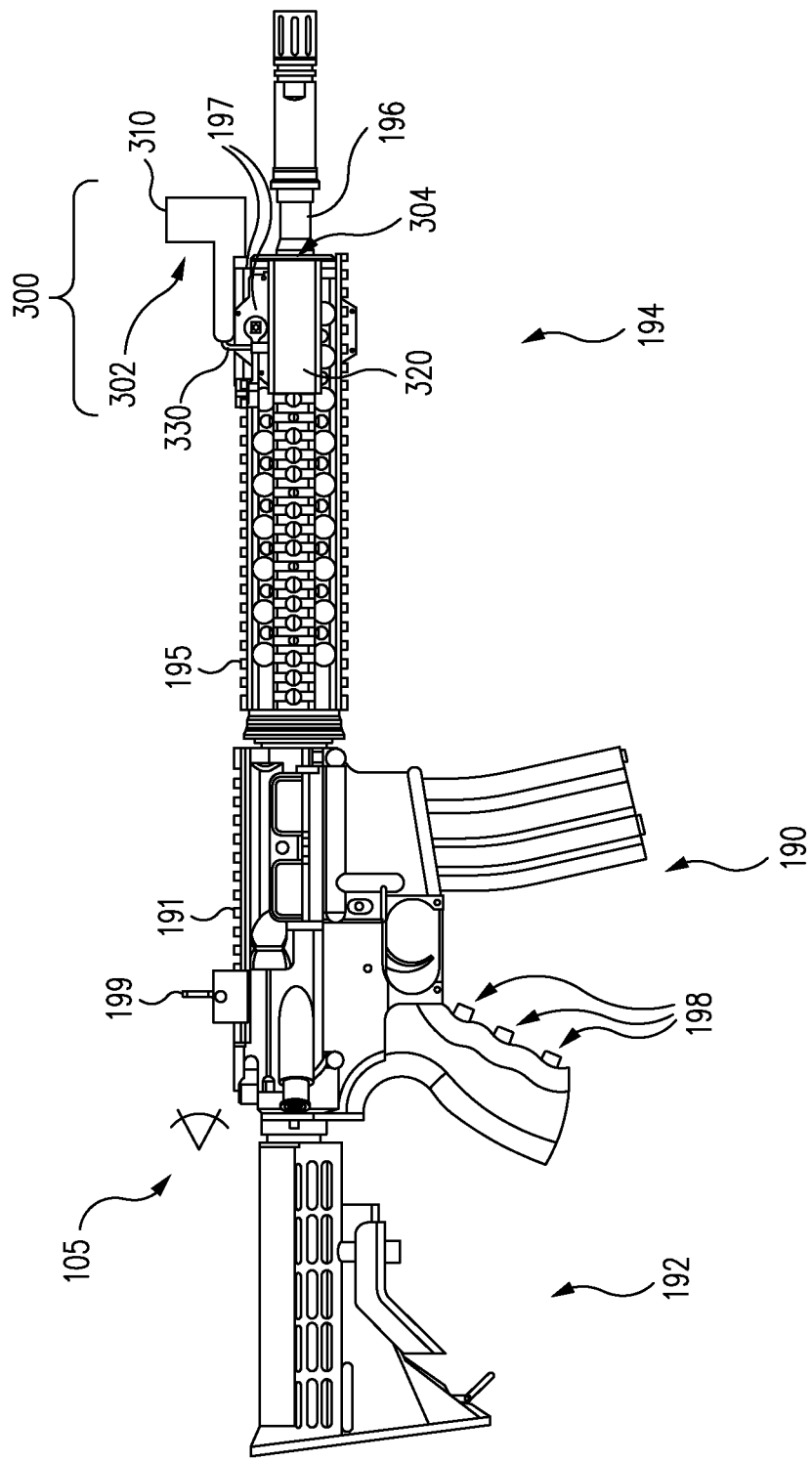
FIG. 3 illustrates a sight system including a projector having a beam splitting cube and cameras mounted on a rifle in accordance with an embodiment of the disclosure.

FIG. 3 illustrates a sight system 300 including a projector 310 having a beam splitting cube and cameras 320 mounted on rifle 190 in accordance with an embodiment of the disclosure. Although a single camera 320 is shown in FIG. 3, one or more additional cameras 320 may be positioned on a far side of rifle 190 in a similar manner as cameras 220 shown in FIGS. 2B-C. In one embodiment, projector 310 and each of cameras 320 may be mounted on rifle 190 using one or more rail clamp mounts 197.

It will be appreciated that sight system 300 may be implemented in a similar fashion as sight system 100 and/or sight system 200. In this regard, the various features described with regard to FIGS. 1A-C and 2A-C may be implemented in the embodiments shown in FIG. 3, and cameras 320 may be implemented in the manner of cameras 220.

In various embodiments described herein, beam combiners may be provided to combine images and/or substantially opaque backgrounds with one or more red dots such that the red dots are superimposed over such images and/or backgrounds. Such beam combiners may be implemented in any desired fashion such as, for example, substantially flat, substantially parabolic, and/or dichroic mirrors, reflectors, beam splitters and/or other appropriate implementations.

In addition to substantially flat or substantially parabolic beam combiners which may be used to implement sight systems 100 and/or 200 (described herein), sight system 300 of FIG. 3 may be further implemented with a beam splitting cube provided within projector 310. Projector 310 may be mounted on rail 195 using rail clamp mount 197. In one embodiment, the beam splitting cube of projector 310 may be implemented as further described herein with regard to FIG. 11.

Light from a target scene may enter an end 304 of one or more of cameras 320 and may be captured by one or more of cameras 320 and/or otherwise processed to provide images. The images may be passed from cameras 320 to a beam splitting cube of projector 310 through connections 330. The images may be received and/or further processed by projector 310 and then projected from an end 302 of projector 310 toward user 105. Projector 310 may also project a red dot from end 302 toward user 105 in accordance with any of the techniques described herein for various sight systems.

Although sight system 300 has been described using separate cameras 320, it is also contemplated that a beam splitting cube may be used in a sight system (e.g., sight system 100) having an integrated camera.

Figure 4:
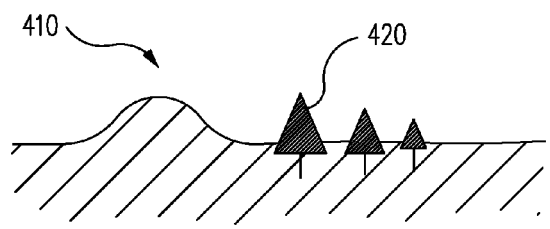
FIG. 4 illustrates a target scene in accordance with an embodiment of the disclosure.
Figures 5A, 5B:
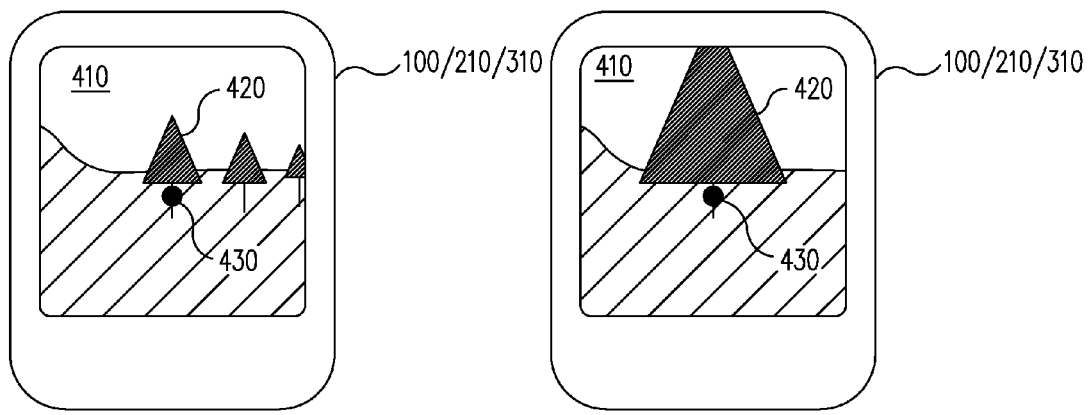
FIG. 5A illustrates a zoomed out view of the target scene of FIG. 4 using a sight system to provide a reflex sight in accordance with an embodiment of the disclosure.
FIG. 5B illustrates a zoomed in view of the target scene of FIG. 4 using a sight system to provide a reflex sight in accordance with an embodiment of the disclosure.
Figure 6:
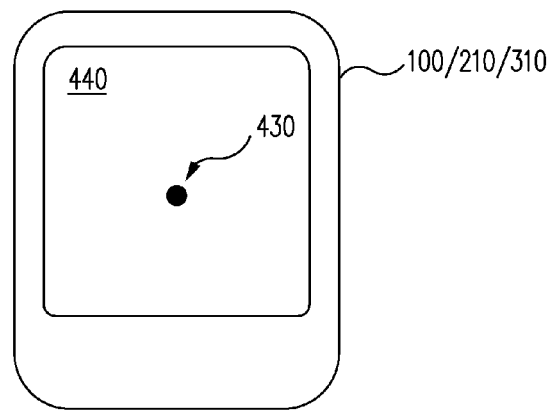
FIG. 6 illustrates a view of the target scene of FIG. 4 using a sight system to provide an occluded sight in accordance with an embodiment of the disclosure.

FIGS. 4-6 illustrate several views perceived by user 105 when operating any of sight systems 100, 200, 300, 700 (described herein), or 800 (described herein) in accordance with various embodiments of the disclosure. For example, FIG. 4 illustrates a target scene 410 in accordance with an embodiment of the disclosure. For example, target scene 410 may represent a view of a desired target area as perceived by a naked eye of user 105 (e.g., without the aid of sight system 100/200/300/700/800). As shown in FIG. 4, target scene 410 includes a target 420 which, for purposes of example, is a target that user 105 intends to strike using rifle 190.

FIGS. 5A and 5B illustrate zoomed out (e.g., no magnification) and zoomed in (e.g., magnified) views, respectively, of target scene 410 of FIG. 4 using sight system 100/200/300/700/800 to provide a reflex sight in accordance with an embodiment of the disclosure. In FIGS. 5A and 5B, images of target scene 410 are provided by a display of sight system 100/200/300/700/800 shown with a red dot 430 superimposed onto target scene 410 by sight system 100/200/300/700/800. In this regard, one or more cameras of sight system 100/200/300/700/800 provide an image of target scene 410 to a display of sight system 100/200/300/700/800 (e.g., with or without optional processing described herein). It will be appreciated that target scene 410 is shown in a zoomed out fashion in FIG. 5A and target scene 410 is shown in a zoomed in fashion in FIG. 5B (e.g., as a result of optical and/or digital zoom features of sight system 100/200/300/700/800).

FIG. 6 illustrates a view of target scene 410 of FIG. 4 using sight system 100/200/300/700/800 to provide an occluded sight in accordance with an embodiment of the disclosure. In this example, one or more cameras and/or a display of sight system 100/200/300/700/800 have been disabled (e.g., by adjusting user controls 160). As a result, images of target scene 410 are not provided by a display of sight system 100/200/300/700/800. Rather, sight system 100/200/300/700/800 provides a dark or opaque background 440 to user 105. However, sight system 100/200/300/700/800 continues to project red dot 430 to user 105 such that red dot 430 is superimposed upon background 440 as viewed by user 105 in the manner shown in FIG. 6.

In one embodiment, user 105 may use two eyes to view target scene 410 when sight system 100/200/300/700/800 is operated as an occluded sight. In this regard, a first eye of user 105 may view sight system 100/200/300/700/800 in the manner shown in FIG. 6 wherein red dot 430 is superimposed on background 440. Also in this embodiment, a second eye of user 105 may view target scene 410 in the manner shown in FIG. 4. Specifically, the second eye of user 105 may see a relatively unencumbered view of target scene 410 including target 420.

As a result, because user 105 sees a view corresponding to FIG. 6 with the first eye, and a view corresponding to FIG. 4 with the second eye, user 105 may effectively perceive a combined view corresponding to FIG. 5A even while operating sight system 100/200/300/700/800 as an occluded sight. That is, user 105 may perceive a combined view corresponding to FIGS. 4 and 6 superimposed with each other. Thus, similar to the reflex sight embodiment described above, user 105 may also adjust the alignment of rifle 190 as desired using an occluded sight embodiment to position red dot 430 over target 420 to aim rifle 190 at target 420. In one embodiment, red dot 430 may be brighter when used in the occluded sight embodiment in comparison to the reflex sight embodiment.

In one embodiment, sight system 100/200/300/700/800 may include a detector, such as an accelerometer, an audio detector, and/or any other suitable device (e.g., provided by any of the processing blocks described herein or elsewhere as appropriate), that can detect the operation of a firing mechanism (e.g., the fall of a hammer) of rifle 190. If the detector is activated, when the user pulls the trigger of rifle 190, the detector will detect the operation of the firing mechanism, and cause some feedback (e.g., a visible, audible, tactile, or other type of indication) to be output to the user at the instant rifle 190 is fired (e.g., in either dry fire or live fire operations). For example, in one embodiment, a sensor such as an accelerometer may provide one or more signals to a microcontroller (e.g., provided by any of the processing blocks described herein or elsewhere as appropriate) of sight system 100/200/300/700/800 in response to operation of the firing mechanism. In response to the one or more signals, the microcontroller may cause appropriate components of sight system 100/200/300/700/800 to provide the feedback.

The feedback provided to the user 105 may take any desired form. In one embodiment, the feedback may be in the form of red dot 430 increasing in brightness. In this regard, red dot 430 may temporarily appear brighter to user 105 through appropriate operation of a light source (e.g., light source 240, 351, 740, and/or 852 described herein) for a brief period of time. Such operation can provide user 105 with helpful visual feedback when operating sight system 100/200/300/700/800 in either dry fire or live fire applications.

In another embodiment, the feedback may be in the form of red dot 430 flashing. As a result, the user's brain registers the location of the red dot 430 relative to the target scene 410 at the instant the trigger is pulled. This allows the user to see where the rifle 190 was aimed at the instant the rifle 190 fired (e.g., in live fire applications) or would have fired (e.g., in dry fire applications).

In another embodiment, the feedback may be in the form of red dot 430 briefly changing color at the instant the rifle 190 fired (e.g., in live fire applications) or would have fired (e.g., in dry fire applications). Persons of ordinary skill in the art will understand that a wide variety of audio, visual, or tactile indicators may be used to indicate to the user the instant that the weapon is fired. In one embodiment, data regarding the location, orientation, movement, and aim point relative to a target can be collected by sensors located on the rifle 190, provided as part of sight system 100/200/300/700/800, and/or in the target scene 410 at the instant of firing. This data can then be analyzed to determine the accuracy of dry fire or live fire shots.

In one embodiment, user 105 may switch between using an occluded sight and a reflex sight. For example, user 105 may operate sight system 100/200/300/700/800 as an occluded sight to initially aim rifle 190. Thereafter, user 105 may switch sight system 100/200/300/700/800 to operate as a reflex sight (e.g., by operating user controls 160, 198, 260, 760, and/or 860) and then further aim rifle 190 using images projected by sight system 100/200/300/700/800.

Figure 7A:
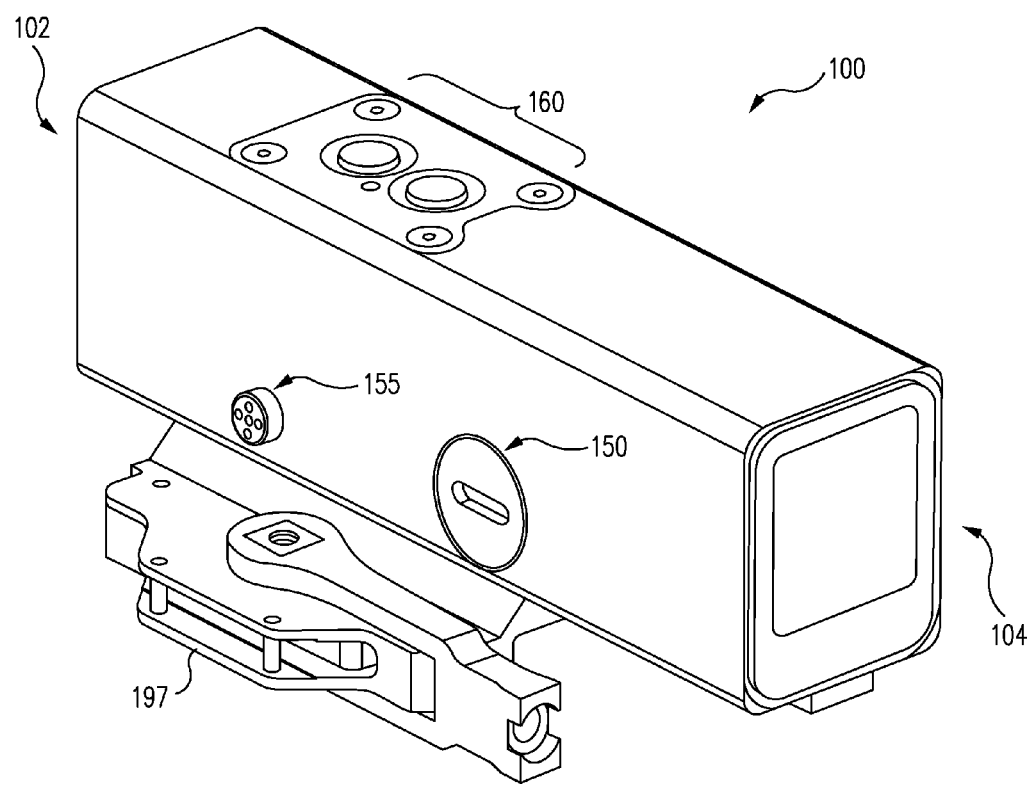
FIG. 7A illustrates a perspective view of the sight system of FIGS. 1A-C in accordance with an embodiment of the disclosure.

FIG. 7A illustrates a perspective view of sight system 100 of FIGS. 1A-C in accordance with an embodiment of the disclosure. As shown in FIG. 7A, sight system 100 includes user controls 160 which may be used to operate sight system 100 in accordance with various techniques described herein. Sight system 100 also includes a cover 150 that may be selectively removed (e.g., by user 105) to insert and/or replace a power source such as a battery. In addition, sight system 100 includes an input port 155 which may be used to receive images (e.g., video images and/or still images) from an external camera (e.g., one or more of cameras 220 and/or 320) which may be used by sight system 100 in addition to, or instead of, images provided by an integrated camera of sight system 100.

Additional implementation details of several embodiments of sight system 100 are further discussed below with regard to FIGS. 7B-C and 8A-E.

Figure 7B:
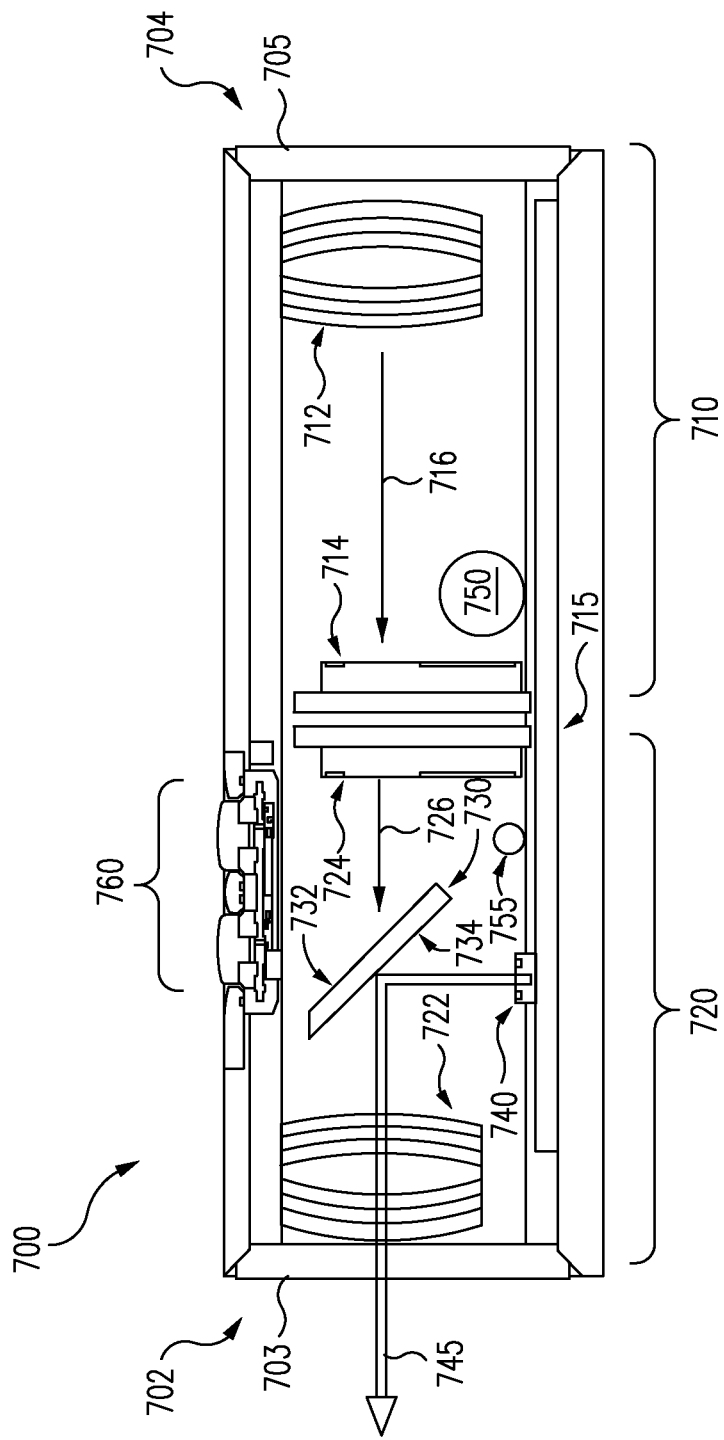
FIGS. 7B-C illustrate several views showing interior features that may be used to implement the sight system of FIGS. 1A-C with a substantially flat beam combiner in accordance with various embodiments of the disclosure.
Figure 7C:
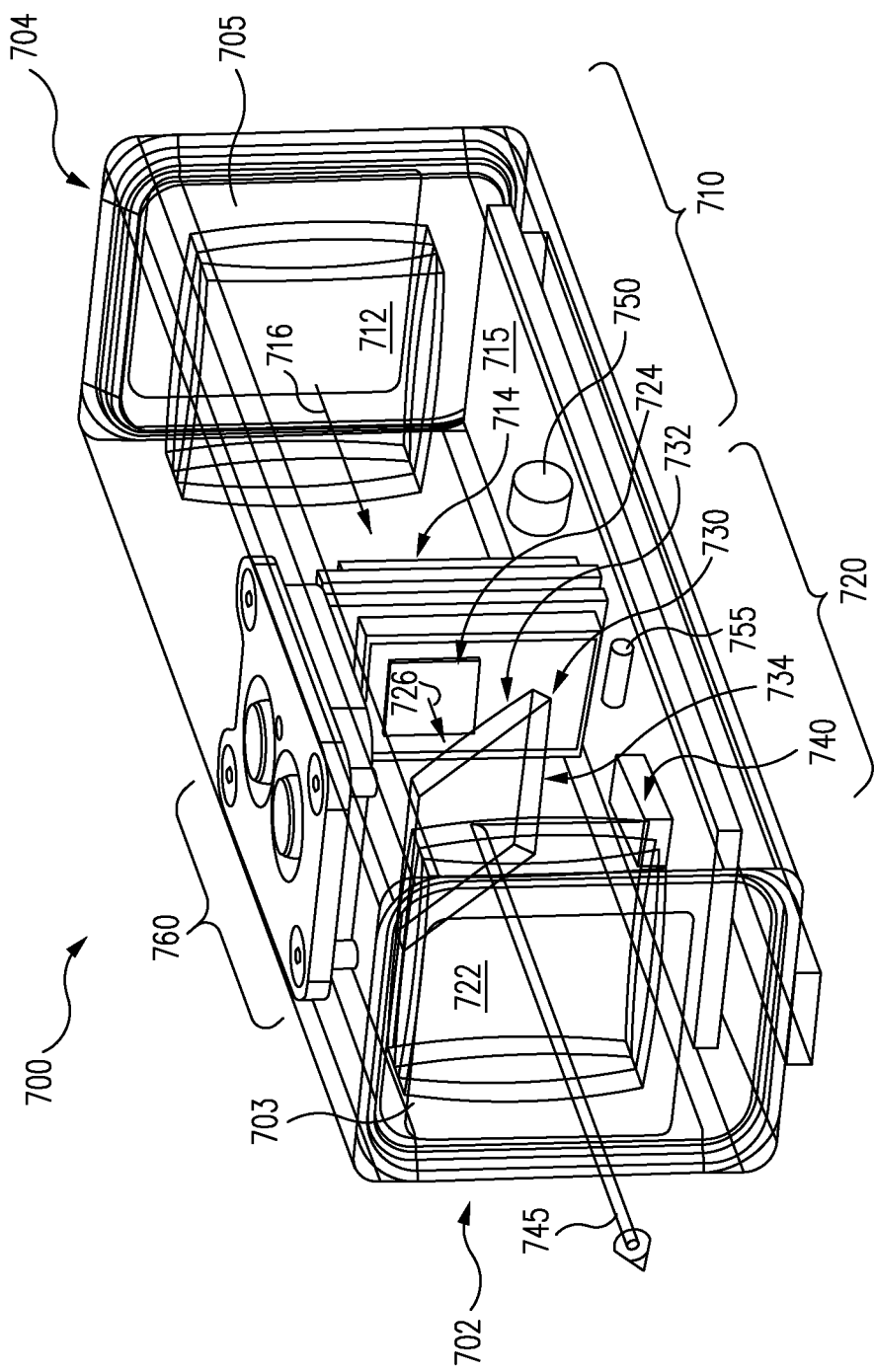

For example, FIGS. 7B and 7C illustrate side and perspective views showing interior features of a particular implementation (labeled 700) of sight system 100 using a substantially flat beam combiner in accordance with various embodiments of the disclosure. As shown in FIGS. 7B and 7C, sight system 700 includes a camera 710 for capturing images from a target scene (e.g., target scene 410) and also includes image/red dot projecting components 720 (e.g., a projector). Referring now to camera 710, light from target scene 410 enters a window 705 at an end 704 of sight system 700. The received light passes through optics 712 (e.g., focusing, collimating, and/or zoom optics for particular wavelengths) and is received (denoted by an arrow 716) by a camera sensor 714. For example, in one embodiment, optics 712 may be used to provide optical zoom features for providing zoomed images of target scene 410 to camera sensor 714. Camera sensor 714 may capture the received light to effectively capture images (e.g., zoomed or non-zoomed images) of target scene 410.

Various types of camera sensors 714 may be used. In one embodiment, camera sensor 714 may be implemented as one or more charge-coupled devices (CCDs) and/or complementary metal-oxide-semiconductor (CMOS) sensors capable of capturing desired wavelengths. For example, infrared images may be captured (e.g., to facilitate night vision applications) using an appropriate camera sensor 714 capable of capturing wavelengths in a range of approximately 0.85 to 1 microns. Advantageously, the costs associated with camera sensor 714 may be reduced by using appropriate sensors intended for visible light capture that also capture infrared wavelengths (e.g., separate visible light and infrared sensors may not be required).

In another embodiment, camera sensor 714 may be implemented as a high resolution sensor. As a result, digital zoom operations performed on images captured by camera sensor 714 may provide sufficient resolution to effectively aim rifle 190 when using sight system 700 as a reflex sight.

Various types of cameras 710 may be used. For example, in one embodiment, camera 710 may capture images of visible light. In other embodiments, camera 710 may be implemented as an infrared camera, thermal camera, hyperspectral camera, and/or another type of camera as may be appropriate in particular applications. Thus, infrared images, thermal images, and/or other types of images of any desired spectra may be captured.

Camera 710 may be implemented with additional features as may be desired in particular applications. For example, in one embodiment, camera 710 may be implemented as a focusable camera to selectively focus the captured images (e.g., by selectively adjusting optics 712 through appropriate actuators or otherwise).

Although a single camera 710 is illustrated in FIGS. 7B-C, any desired number of cameras 710 may be used. For example, in one embodiment, user 105 may select one or more integrated and/or non-integrated cameras to capture different types of images. For example, an input port 755 may be used to receive images from one or more external cameras which may be used in addition to, or instead of, images provided by camera 710 as similarly discussed with regard to input port 155.

Optionally, sight system 700 may include a processing block 715 for adjusting images captured by camera 710 using appropriate hardware and/or software in any desired manner. For example, in one embodiment, processing block 715 may adjust images captured by camera 710 to compensate for different target distances, environmental conditions, and/or other factors. In another embodiment, processing block 715 may perform digital zoom operations on captured images to provide zoomed images to display 724.

Referring now to image/red dot projecting components 720, sight system 700 includes a display 724 which may selectively display images received from camera 710, processing block 715, and/or input port 755 (e.g., received directly from camera 710, received from camera 710 through processing block 715, and/or received from one or more external cameras). Different types of displays 724 may be used. For example, in various embodiments, display 724 may be implemented as a liquid crystal display (LCD), a Digital Light Processing (DLP) display (e.g., which may provide brighter images than conventional LCD implementations in certain embodiments), an organic light emitting diode (OLED) display, a plasma display, a cathode ray tube (CRT) display, or another type of display as may be appropriate in particular applications. In one embodiment, display 724 may be implemented using any appropriate digital mirror device (DMD) available, for example, from Texas Instruments. For example, such a DMD device (e.g., a micromirror array) may be illuminated by a light source and may be may be implemented in accordance with a display 350 and a light source 351 of FIG. 11 further described herein.

In one embodiment, display 724 may be implemented with a small form factor to facilitate convenient sizing of sight system 700 for positioning on rifle 190. For example, in one embodiment, display 724 may provide a display surface of approximately one inch by one inch. However, any desired display surface size may be used in various embodiments.

Images presented by display 724 may project through a substantially flat beam combiner 730 (also referred to as a beam splitter) substantially in the direction of an arrow 726. Although a substantially flat beam combiner 730 is shown in FIGS. 7B-7C, other embodiments are also contemplated. For example, in one embodiment, beam combiner 730 may be replaced by a beam splitting cube such as a beam splitting cube 340 of FIG. 11 further described herein.

In various embodiments, beam combiner 730 may be implemented as a transparent or semi-transparent beam combiner which may pass light received from display 724 (e.g., when images are presented on display 724). In various embodiments, a surface 732 of beam combiner 730 may be coated with appropriate material to selectively pass and/or reflect desired bandwidths of light received from display 724. In one embodiment, beam combiner 730 may be implemented with one or more polycarbonate materials. Light passing through beam combiner 730 also passes through optics 722 (e.g., collimating optics) and a window 703 at an end 702 of sight system 700. Optics 722 may operate to collimate light passing through beam combiner 730. Accordingly, when viewing end 702 of sight system 700, user 105 may see images captured by camera 710.

Sight system 700 also includes a light source 740 which may be used to project, for example, red light toward beam combiner 730 to provide red dot 430. Various types of devices may be used to implement light source 740 such as, for example, light emitting diodes (LEDs), laser diodes (e.g., configured for non-lasing operation), and/or other appropriate devices. As further described herein, other techniques may be used in other embodiments to provide red dot 430 (e.g., without using light source 740).

Beam combiner 730 may cause light to be reflected substantially in the direction of an arrow 745. In various embodiments, a surface 734 of beam combiner 730 may be coated with appropriate material to selectively pass and/or reflect desired bandwidths of light received from light source 740. Light from light source 740 reflecting off of beam combiner 730 also passes through optics 722 and window 703. Optics 722 may operate to collimate light from light source 740 as red dot 430 which may be viewed by user 105.

Advantageously, red dot 430 may remain visible to user 105 when the user's eye is properly aligned with end 702 and window 703 of sight system 700. Conversely, red dot 430 may not remain visible to user 105 when the user's eye is not so aligned. Accordingly, user 105 may use sight system 700 knowing that a potential target is properly sighted when red dot 430 is viewed on the potential target.

Red dot 430 may be perceived by user 105 as being superimposed over the images provided by display 724 (e.g., as shown in FIGS. 5A and 5B). Sight system 700 may be implemented such that the position of red dot 430 relative to the images provided by display 724 may be used to sight rifle 190, thus providing a reflex sight.

Sight system 700 also includes user controls 760 (e.g., which may be used to implement user controls 160 of sight system 100). User controls 760 may be used to adjust the operation of sight system 700. For example, in one embodiment, user controls 760 may be used to selectively disable camera 710 and/or display 724. In this case, display 724 may provide only a dark or opaque background (e.g., a blank image) to user 105. User 105 may continue to receive light from light source 740 as reflected by beam combiner 730. As a result, sight system 700 may be used to provide an occluded sight with red dot 430 provided by light source 740 superimposed over a dark or opaque background of display 724 (e.g., as shown in FIG. 6).

In various embodiments, user controls 760 may be used to perform other operations such as, for example, turning light source 740 and/or sight system 700 on or off, adjusting the zoom and/or focus of camera 710, selecting one or more cameras 710 to capture images, adjusting the image processing provided by processing block 715, and/or other operations as may be desired in particular applications.

Sight system 700 also includes a power source 750 (e.g., a battery or other appropriate power source) which may be selectively inserted and/or replaced by removal of cover 150.

Figure 8A:
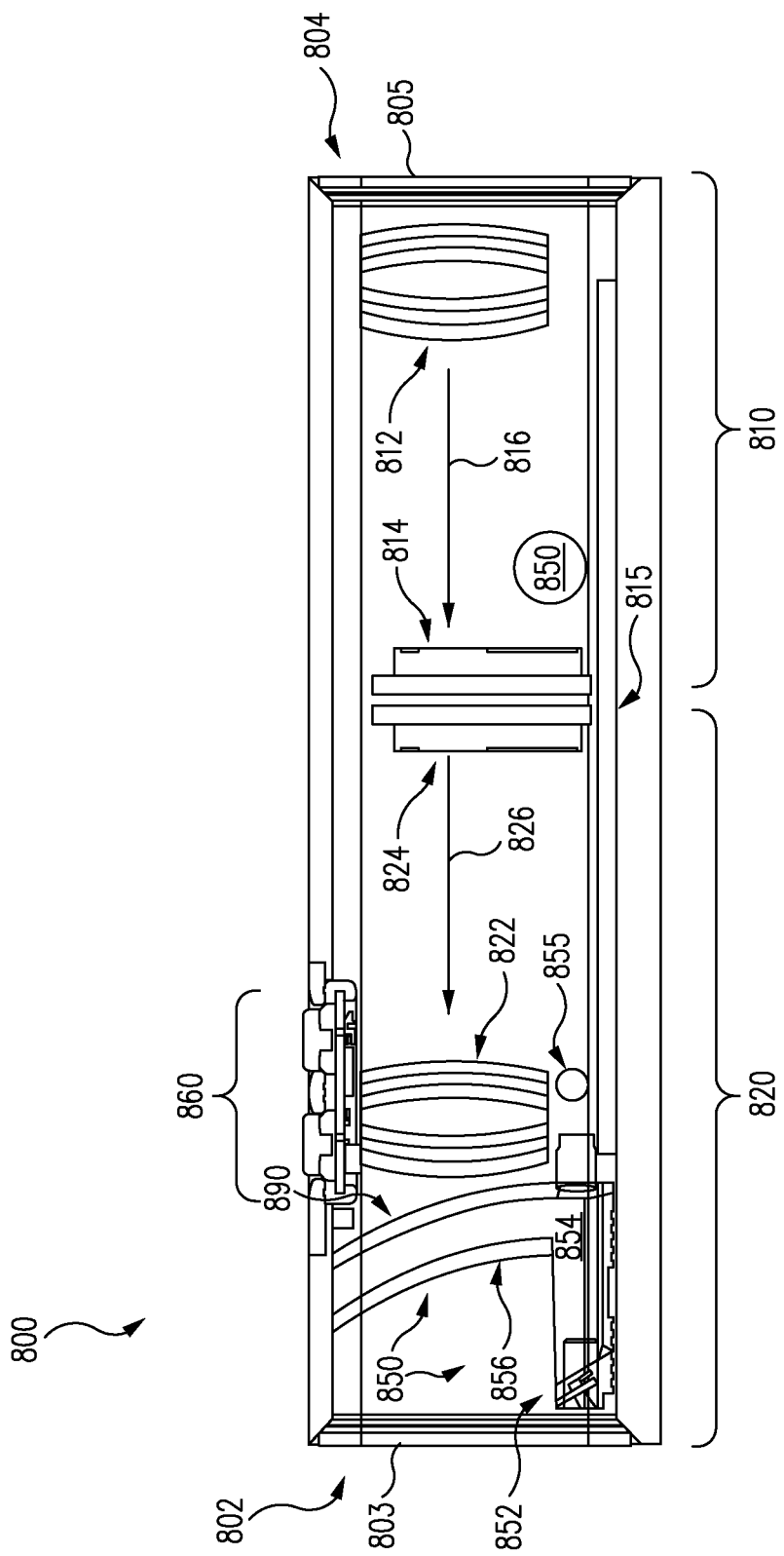
FIGS. 8A-B illustrate several views showing interior features that may be used to implement the sight system of FIGS. 1A-C with a substantially parabolic beam combiner in accordance with various embodiments of the disclosure.
Figure 8B:
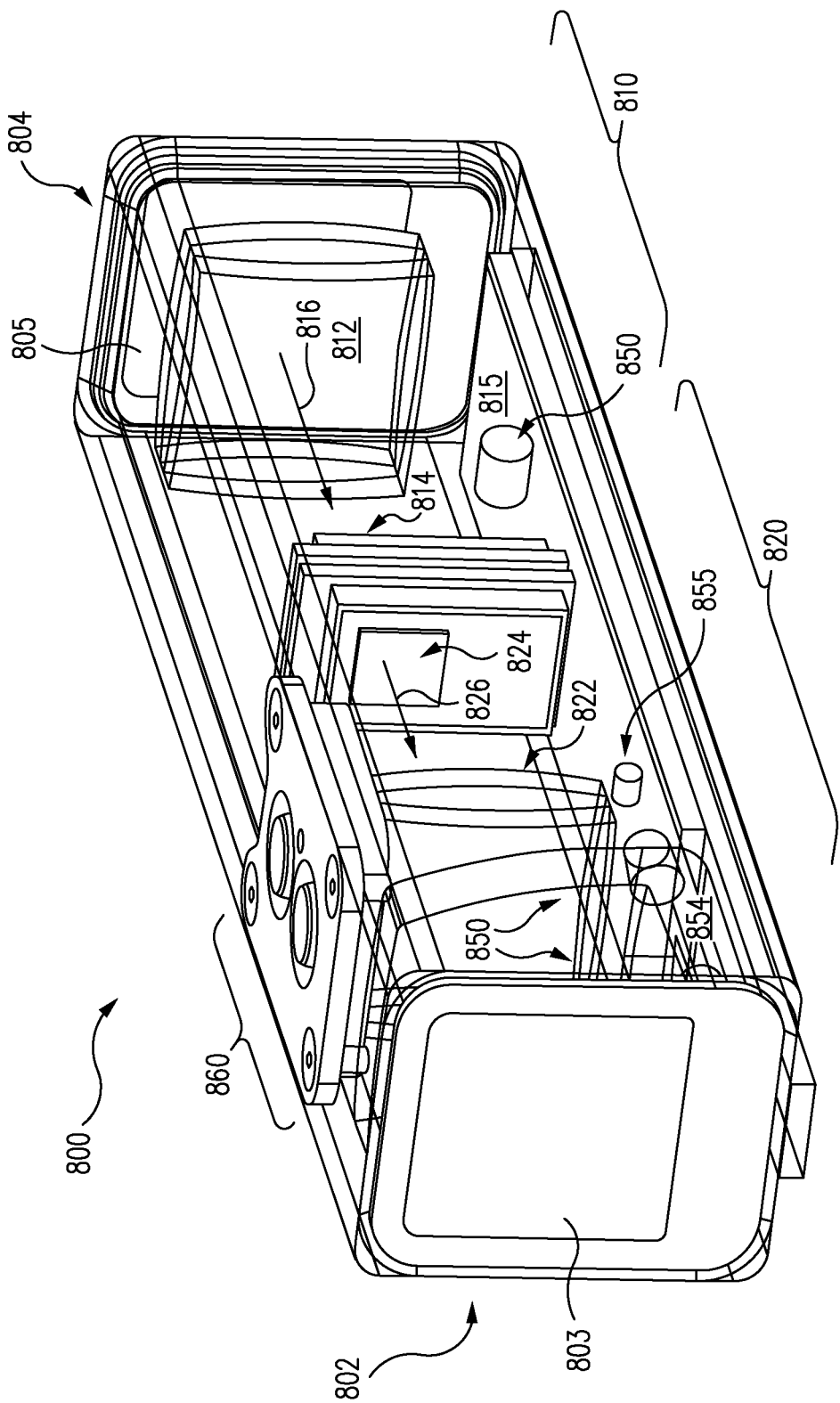

As another example, FIGS. 8A and 8B illustrate side and perspective views showing interior features of a particular implementation (labeled 800) of sight system 100 using a substantially parabolic beam combiner in accordance with various embodiments of the disclosure. As shown in FIGS. 8A and 8B, sight system 800 includes a camera 810 for capturing images from a target scene (e.g., target scene 410) and also includes image/red dot projecting components 820 (e.g., a projector). It will be appreciated that sight system 800 also includes ends 802/804, windows 803/805, a processing block 815, a power source 850, an input port 855, and user controls 860, which may be implemented in the same and/or similar manner as other corresponding features of sight system 700.

Comparing sight system 800 to sight system 700, it will be appreciated that the configuration of camera 810 may be implemented with optics 812 that pass light received (denoted by an arrow 816) by a camera sensor 814 in a similar fashion as corresponding components of camera 710 described herein. It will also be appreciated that the configuration of image/red dot projecting components 820 differs from that of image/red dot projecting components 720. In particular, image/red dot projecting components 820 include a plane wave generator 850 that includes a light source 852 and a substantially parabolic beam combiner 854 positioned between optics 822 and a window 803.

Images presented by a display 824 (e.g., implemented in the manner of display 724) may project substantially in the direction of an arrow 826 and through optics 822 (e.g., collimating optics), through beam combiner 854, and through window 803 at end 802 of sight system 800. In various embodiments, beam combiner 854 may be implemented as a transparent or semi-transparent beam combiner which may pass light received from display 824 (e.g., when images are presented on display 824). In one embodiment, beam combiner 854 may be implemented with one or more polycarbonate materials. In various embodiments, a surface 890 of beam combiner 854 may be coated with appropriate material to selectively pass and/or reflect desired bandwidths of light received from display 824. Optics 822 may operate to collimate light received from display 824. Accordingly, when viewing end 802 of sight system 800, user 105 may see images captured by camera 810.

Sight system 800 also includes a light source 852 which may be used to project, for example, red light toward beam combiner 854 which focuses and reflects the light through window 803 to provide red dot 430. Various types of devices may be used to implement light source 852 such as, for example, the types of devices described herein with regard to light source 740.

In various embodiments, a surface 856 of beam combiner 854 may be coated with appropriate material to selectively pass and/or reflect desired bandwidths of light received from light source 852. Beam combiner 854 may operate to collimate light from light source 852 as red dot 430 which may be viewed by user 105. Accordingly, when viewing end 802 of sight system 800, user 105 may see red dot 430. Similar to sight system 700, user 105 may use sight system 800 knowing that a potential target is properly sighted when red dot 430 is viewed on the potential target.

Figure 8C:
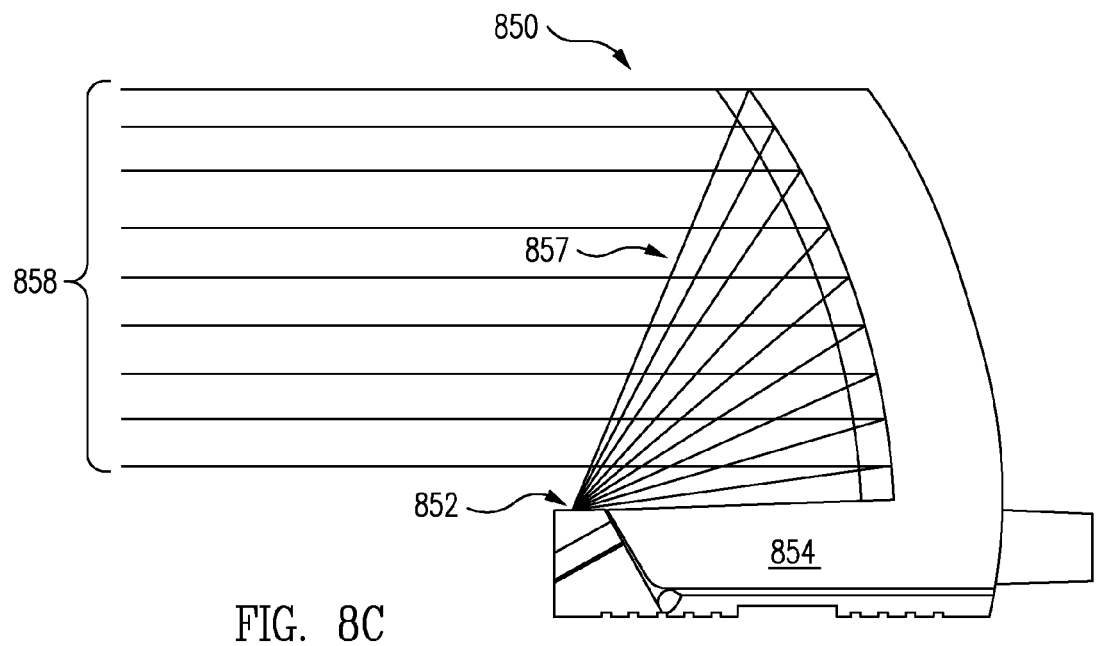
FIGS. 8C-D illustrate several views of a plane wave generator shown in FIGS. 8A-B in accordance with various embodiments of the disclosure.
Figure 8D:
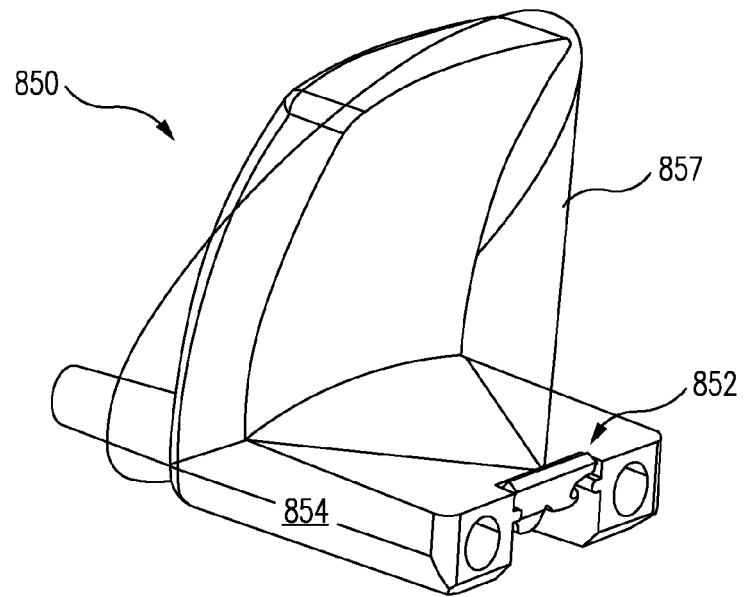

FIGS. 8C and 8D illustrate side and perspective views, respectively, of plane wave generator 850 in accordance with embodiments of the disclosure. Light 857 may be emitted by light source 852 toward beam combiner 854 at various angles in a wide coverage area. Light 857 may be reflected by beam combiner 854 as plane waves as identified by light traces 858 (e.g., ray traces), thus providing red dot 430 that may be viewed by user 105.

Red dot 430 may be perceived by user 105 as being superimposed over the images provided by display 824 (e.g., as shown in FIGS. 5A and 5B). Sight system 800 may be implemented such that the position of red dot 430 relative to the images provided by display 824 may be used to sight rifle 190, thus providing a reflex sight. Similar to sight system 700, sight system 800 may also be used to provide an occluded sight by selectively disabling camera 810 and/or display 824, for example, in response to user controls 860.

Figure 9A:
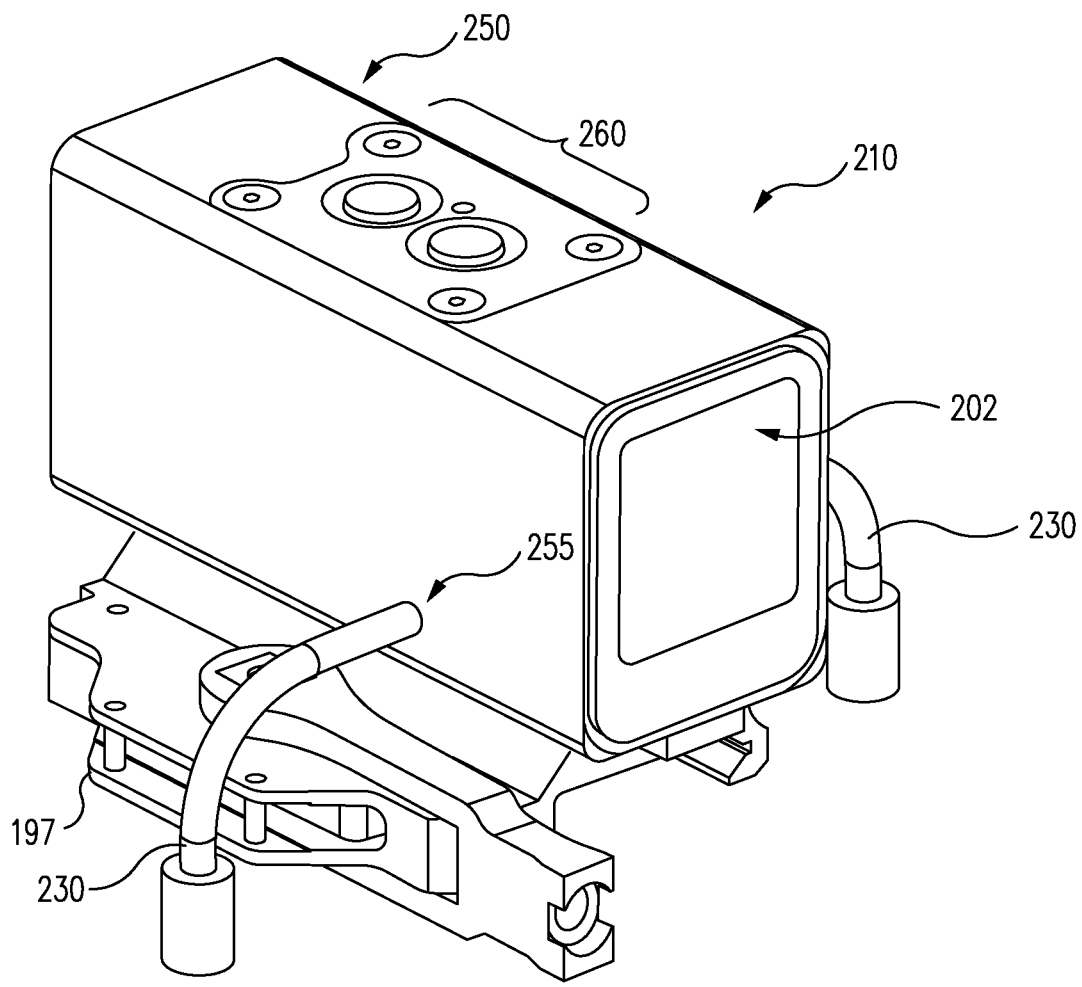
FIG. 9A illustrates a perspective view of a projector of the sight system of FIGS. 2A-C in accordance with an embodiment of the disclosure.

FIG. 9A illustrates a perspective view of projector 210 of sight system 200 of FIGS. 2A-C in accordance with an embodiment of the disclosure. In addition to various features previously described herein, FIG. 9A further illustrates user controls 260 which may be used to operate projector 210 in accordance with various techniques described herein with regard to user controls 160, 760, and 860. Projector 210 also includes a cover 250 (e.g., on the far side of projector 210 in FIG. 9A) and an input port 255 that may be used in a manner similarly described with regard to cover 150 and input port 155.

Figure 9B:
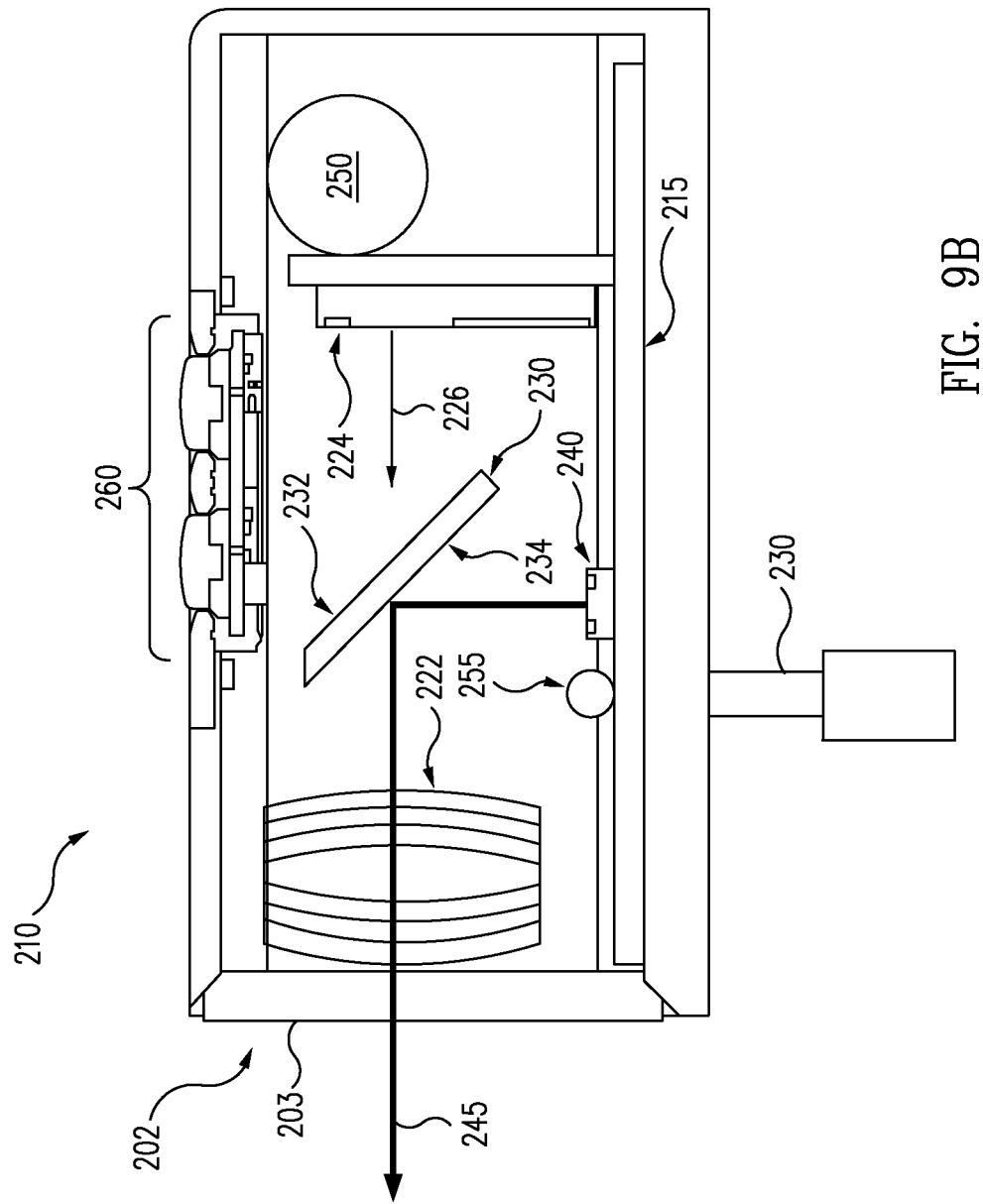
FIGS. 9B-C illustrate several views showing interior features of the projector of the sight system of FIGS. 2A-C in accordance with various embodiments of the disclosure.
Figure 9C:
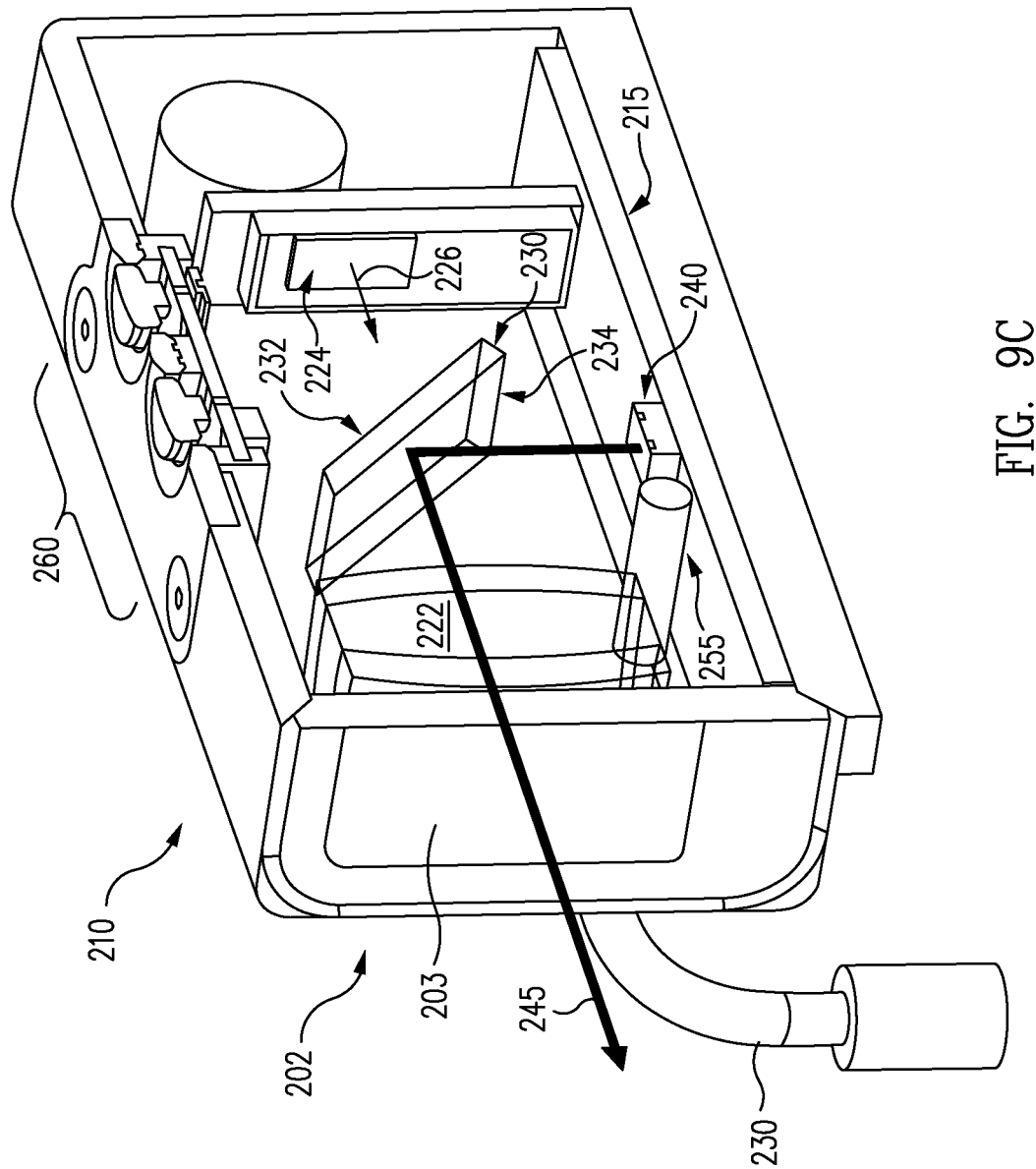

FIGS. 9B and 9C illustrate side and perspective views showing interior features of projector 210 in accordance with various embodiments of the disclosure. As shown in FIGS. 9B and 9C, projector 210 includes end 202, a window 203, a processing block 215, optics 222, a display 224, light emitted by display 224 (denoted by arrow 226), a substantially flat beam combiner 230, a surface 232, a surface 234, a light source 240, a combined image from display 224 and light source 240 (denoted by arrow 245), a power source 250, input port 255, and user controls 260, which may be implemented in the same and/or similar manner as other corresponding features of sight systems 700 and/or 800.

Accordingly, projector 210 may be used to project a red dot 430 (e.g., provided by light source 240) toward user 105. In one embodiment, red dot 430 may be superimposed over images (e.g., images received through one or more connections 230 and/or input port 255) that are also projected toward user 105 to provide a reflex sight. In another embodiment, red dot 430 may be projected without such images to provide an occluded sight.

Figure 10A:
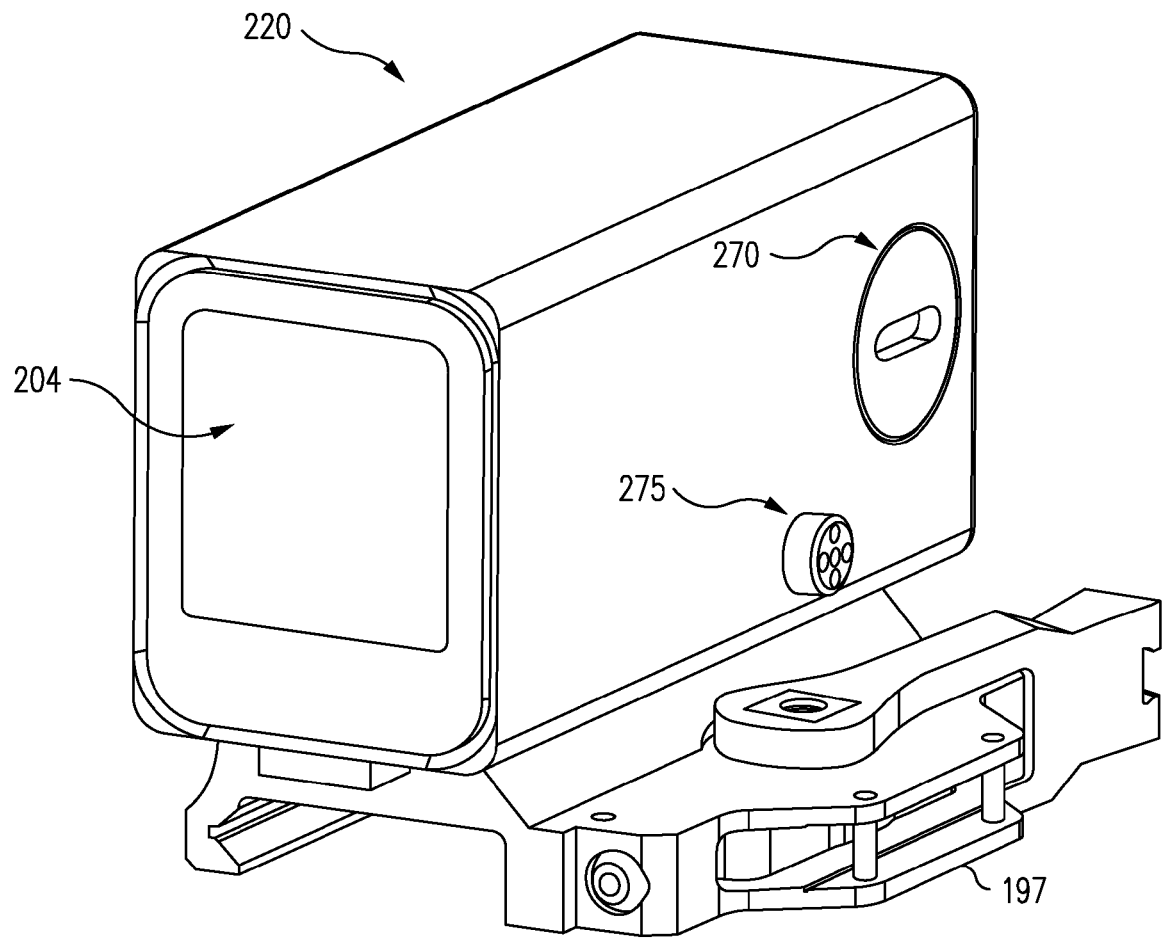
FIG. 10A illustrates a perspective view of a camera of the sight system of FIGS. 2A-C in accordance with an embodiment of the disclosure.

FIG. 10A illustrates a perspective view of camera 220 of sight system 200 of FIGS. 2A-C in accordance with an embodiment of the disclosure. In addition to various features previously described herein, FIG. 10A further illustrates a cover 270 (e.g., that may be used in a manner similarly described with regard to covers 150 and 250) and an output port 275 which may receive one or more connections 230 to pass images from camera 220 to projector 210. In various embodiments, camera 220 may be implemented to support any desired features of camera 710 described herein.

Figure 10B:
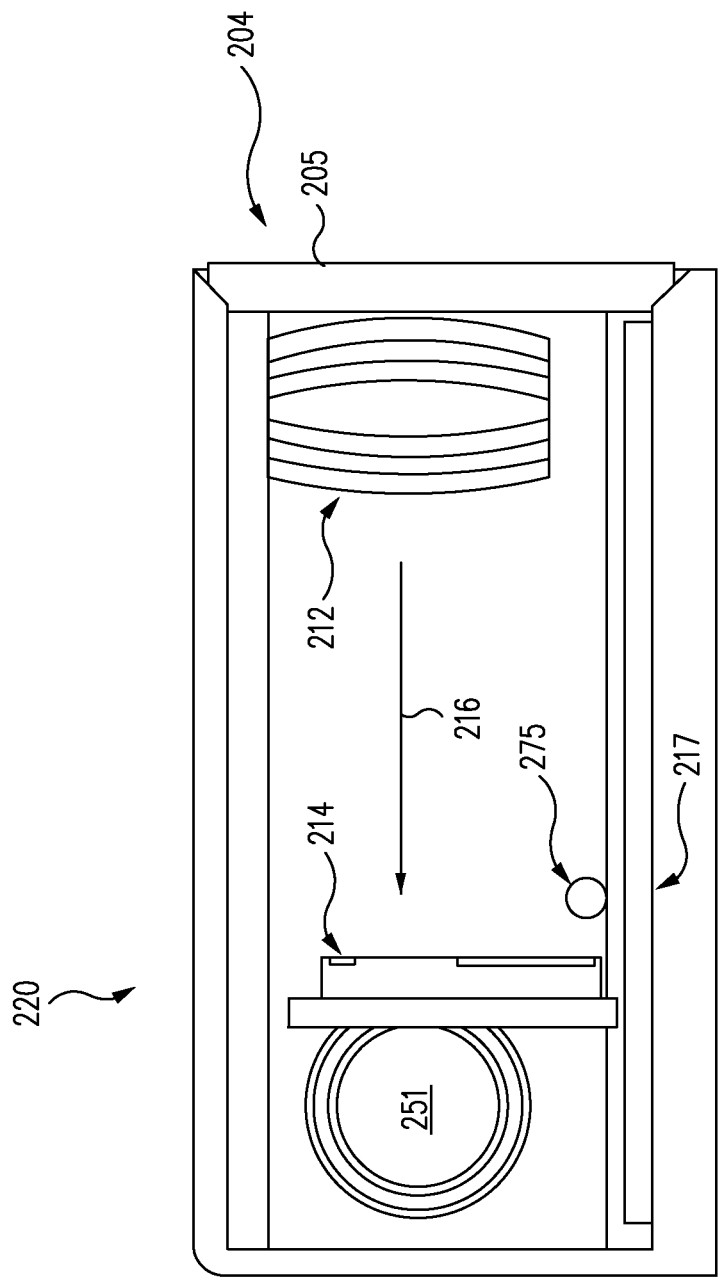
FIGS. 10B-C illustrate several views showing interior features of the camera of the sight system of FIGS. 2A-C in accordance with various embodiments of the disclosure.
Figure 10C:
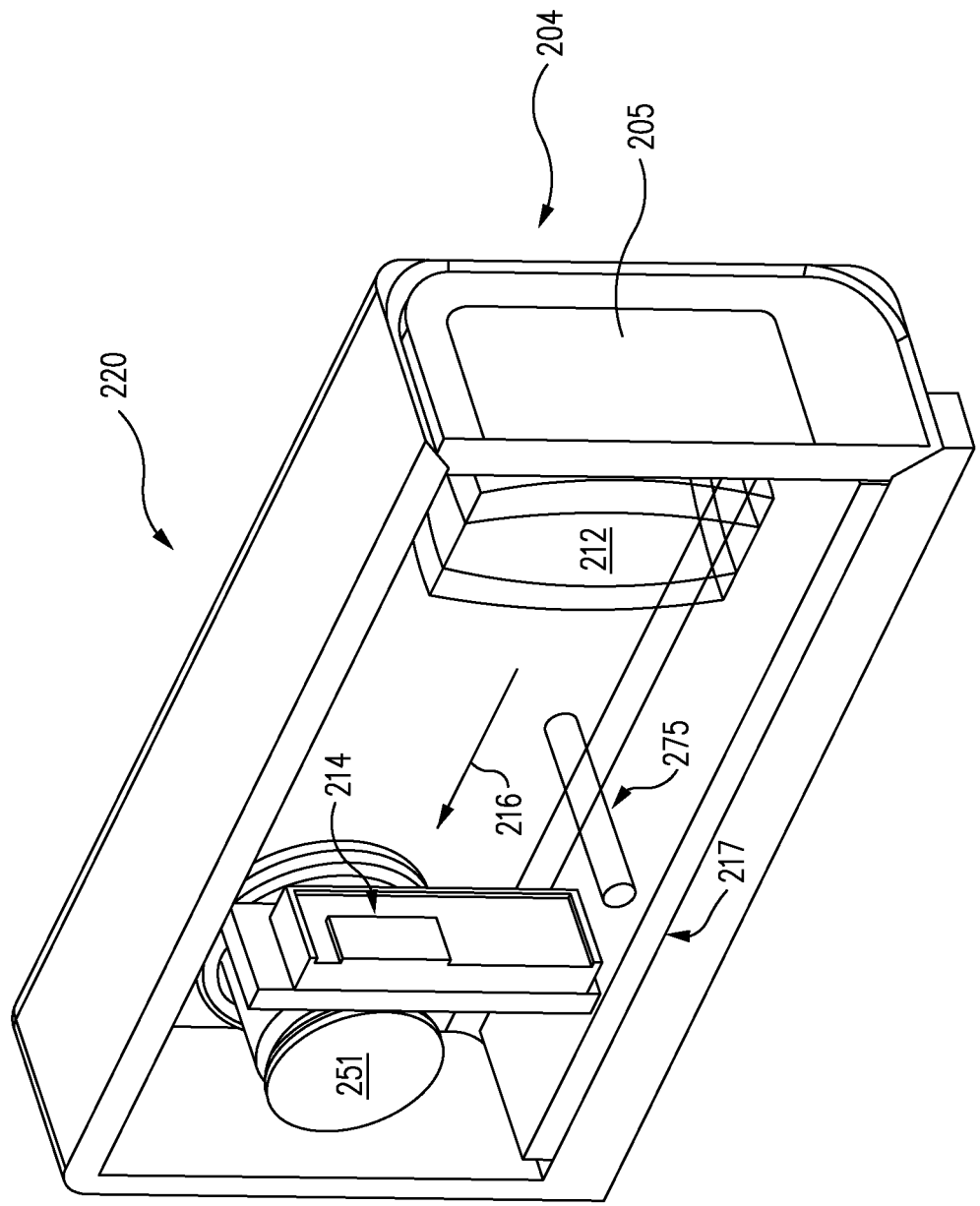

FIGS. 10B and 10C illustrate side and perspective views showing interior features of camera 220 in accordance with various embodiments of the disclosure. As shown in FIGS. 10B and 10C, camera 220 includes end 204, a window 205, optics 212, a camera sensor 214, incoming light passed to camera sensor 214 (denoted by arrow 216), a processing block 217, and a power source 251, which may be implemented in the same and/or similar manner as other corresponding features of sight systems 700 and/or 800. FIGS. 10B and 10C further illustrate output port 275 which may be implemented as described with regard to FIG. 10A. Accordingly, camera 220 may be used to capture images to be provided to projector 210 (e.g., through output port 275 and one or more connections 230) to provide a reflex sight.

Figure 11:
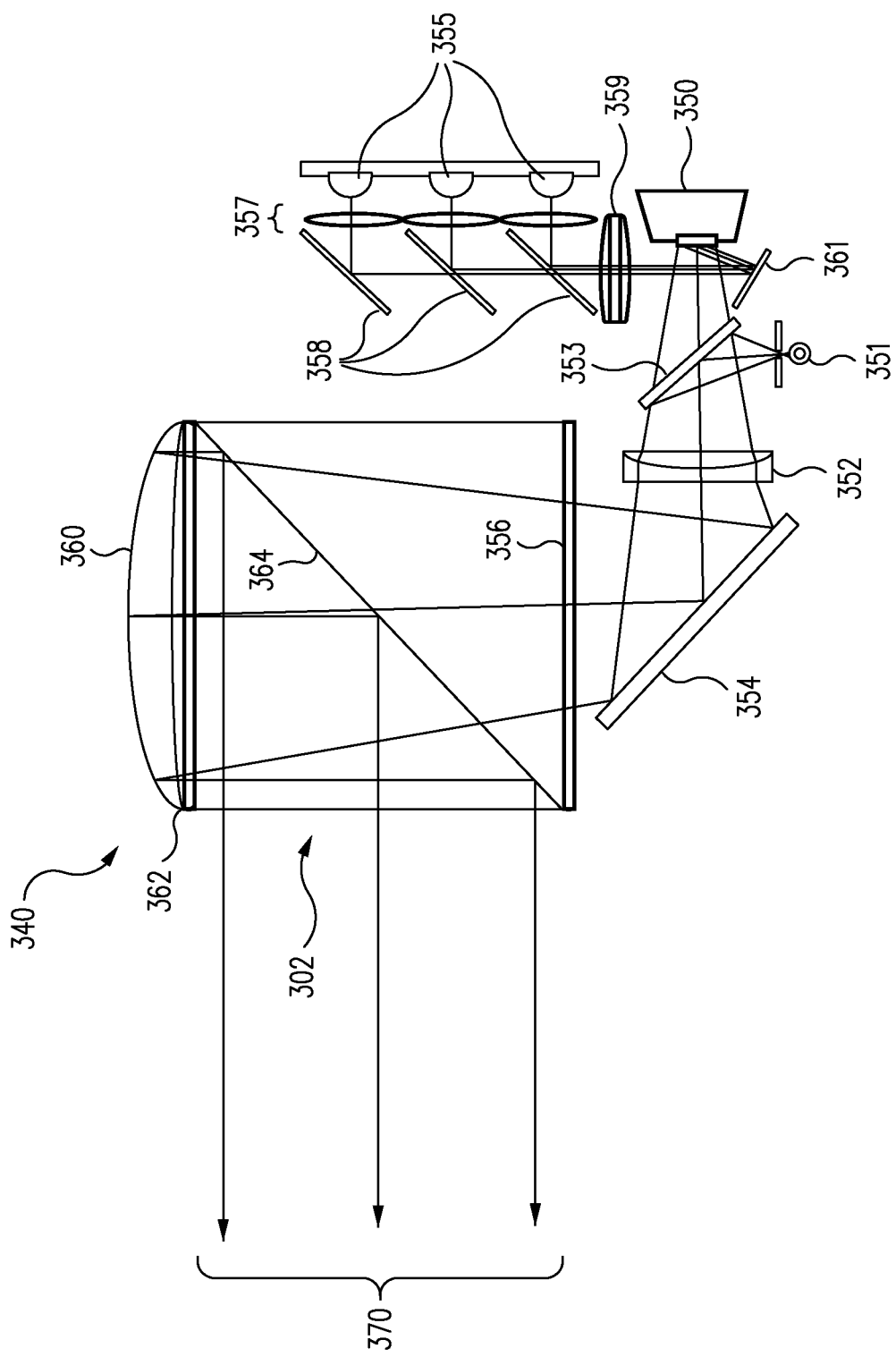
FIG. 11 illustrates a beam splitting cube and related components of the sight system of FIG. 3 in accordance with an embodiment of the disclosure.

FIG. 11 illustrates a beam splitting cube 340 and related components of the sight system 300 of FIG. 3 in accordance with an embodiment of the disclosure. A display 350 (e.g., implemented in the manner of display 724 and/or 824) may receive images from one or more cameras 320 through, for example, one or more output ports 275 and connections 330.

In one embodiment where display 350 is implemented as a DLP display, one or more light sources 355 (e.g., a plurality of LEDs such as red, green, and blue LEDs in one embodiment) may be used to illuminate micromirrors (e.g., an array of micromirrors in one embodiment) of display 350. For example, in such an embodiment, display 350 and/or various other components of FIG. 11 may be implemented using one or more display chips such as a Texas Instruments DLP1700 (480×320 display chip) or a Texas Instruments DLP 5500 (1024×768 display chip). Display 350 and light sources 355 may be positioned relative to each other in any desired fashion to facilitate illumination of the micromirrors by light sources 355. For example, in one embodiment, light provided by light sources 355 passes through lenses 357, reflects off mirrors 358 (e.g., dichroic beam combiners in one embodiment), passes through a lens 359 (e.g., a fly's eye lens in one embodiment), and reflects off a mirror 361 onto micromirrors of display 350.

Micromirrors of display 350 may reflect the light in a pattern determined by the orientations of the micromirrors to project images from display 350. In this regard, the orientations of the micromirrors may be adjusted in response to images received from one or more cameras 320. Various types of devices may also be used to implement the small image source of display 350, such as, for example, liquid crystal displays, organic and/or inorganic light emitting diode (LED) displays, or other types of devices.

Another light source 351 may be used to provide red dot 430. In this regard, light source 351 may be used to project, for example, red light toward a dichroic beam combiner 353 which reflects the light toward optics 352 (e.g., as red dot 430). Various types of devices may be used to implement light source 351 such as, for example, the types of devices described herein with regard to light sources 740 and 852.

The images provided by display 350 pass through dichroic beam combiner 353 to optics 352 (e.g., beam forming optics). The images provided by display 350 and red dot 430 provided by light source 351 pass through optics 352 and are reflected by a mirror 354 (e.g., a fold mirror) into beam splitting cube 340. The images and red dot 430 pass through an optional polarizer 356, a beam combiner 364, and an optional polarization rotator 362. The images and red dot 430 are then reflected by an image collimating optic and mirror 360 back toward beam combiner 364 which reflects the images and red dot 430 out through end 302 as denoted by arrows 370 (e.g., plane waves) for viewing by user 105.

In view of the present disclosure, it will be appreciated that various features set forth herein provide significant improvements to sight systems. In particular, by locating sight system 100, 200, 300, 700, and/or 800 substantially far away from user 105 down the barrel of rifle 190, user 105 may experience improved situational awareness in comparison with conventional sight systems. In addition, sight system 100 may be selectively configured by user 105 to operate as a reflex sight or occluded sight as may be desired in particular applications.

Although image/red dot projecting components 820 and beam splitting cube 340 have been described for generating plane waves, it is contemplated that other components and/or techniques may be used to generate plane waves where appropriate.

Although reticles implemented as red dots have been described herein, different types of light sources, beam combiners, video processors, and/or other technology may be used to provide reticles of different colors (e.g., red, green, or other colors) and/or shapes (e.g., one or more dots, crosshairs, diamonds, chevrons, marks, or other appropriate shapes) in a plane of display 350, 724, or 824 in various embodiments. For example, in one embodiment, reticles may be provided by light sources 351, 740 or 852. In another embodiment, reticles may be provided by one or more of cameras 220, 320, 710, or 810 (e.g., included in images captured by such camera). In another embodiment, reticles may be provided by software and/or hardware of processing blocks 715 or 815 (e.g., added to images captured by one or more of cameras 220, 320, 710, or 810). In another embodiment, reticles may be provided by displays 350, 724, or 824 (e.g., by displaying images that include reticles). In another embodiment, reticles may be provided on windows 203, 205, 703, 705, 803, or 805.

Figure 12A:
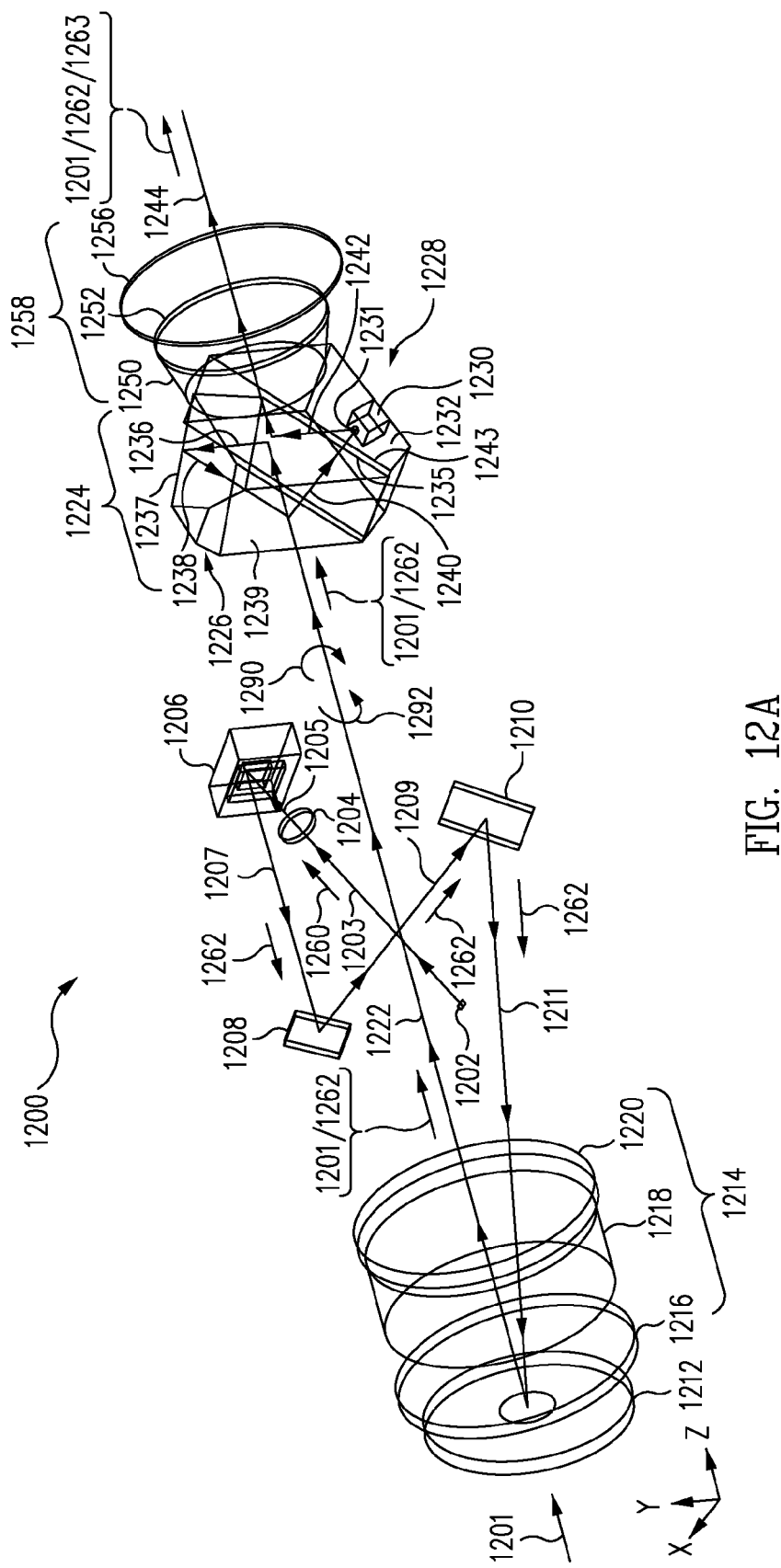
FIGS. 12A-J illustrate views of a sight system 1200 in accordance with various embodiments of the disclosure.
Figure 12B:
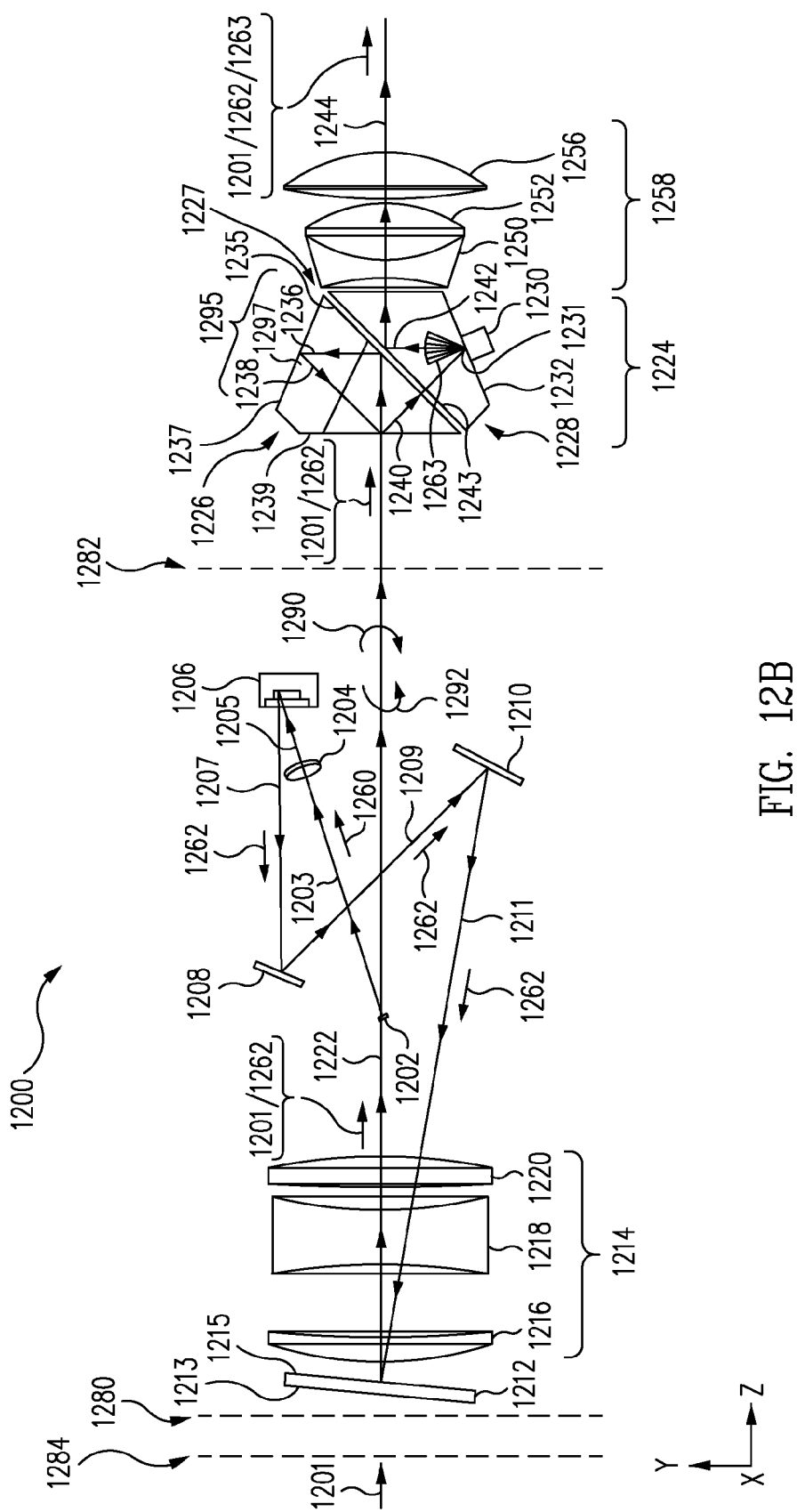
Figure 12C:
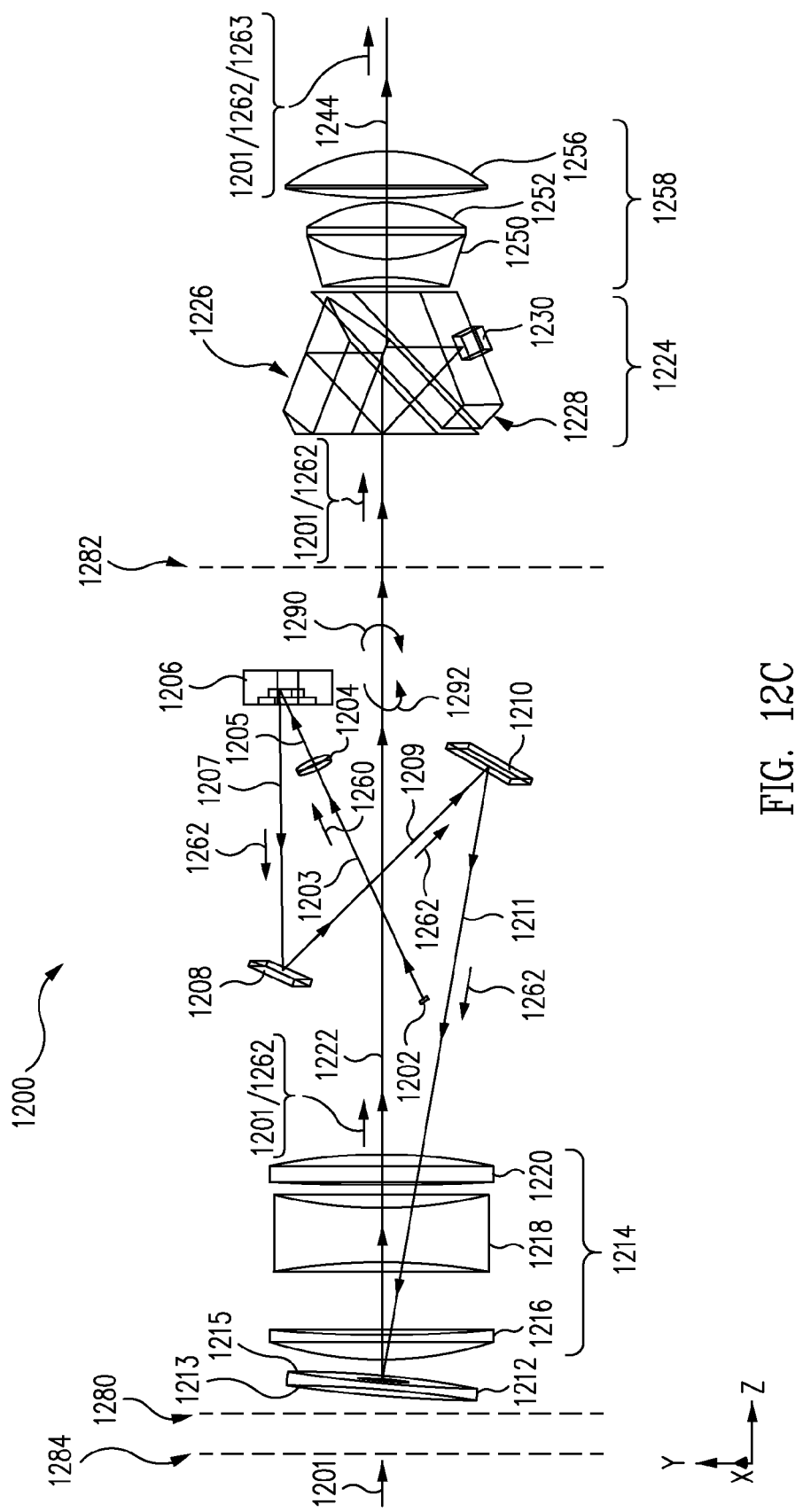
Figure 12D:
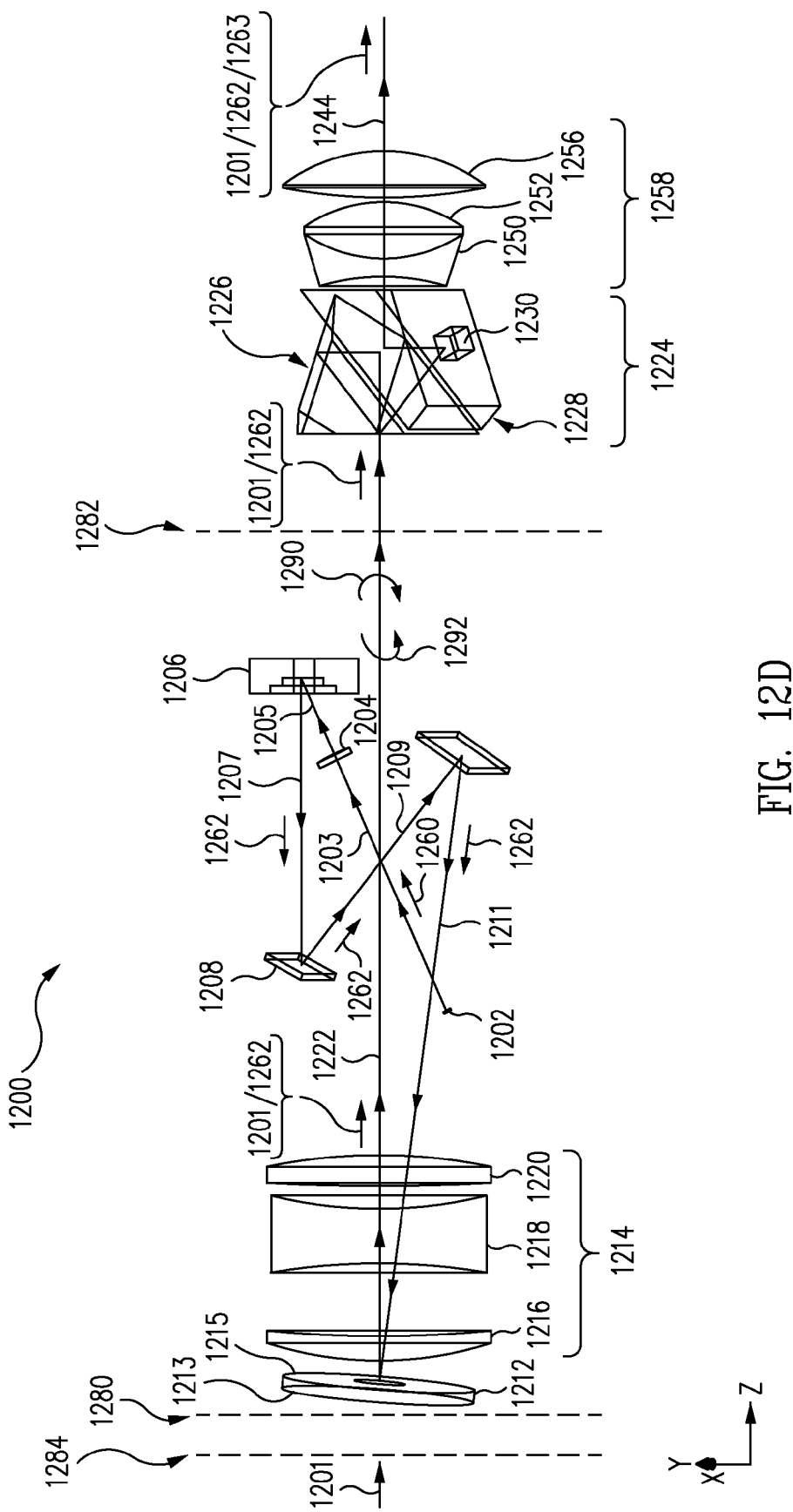
Figure 12E:
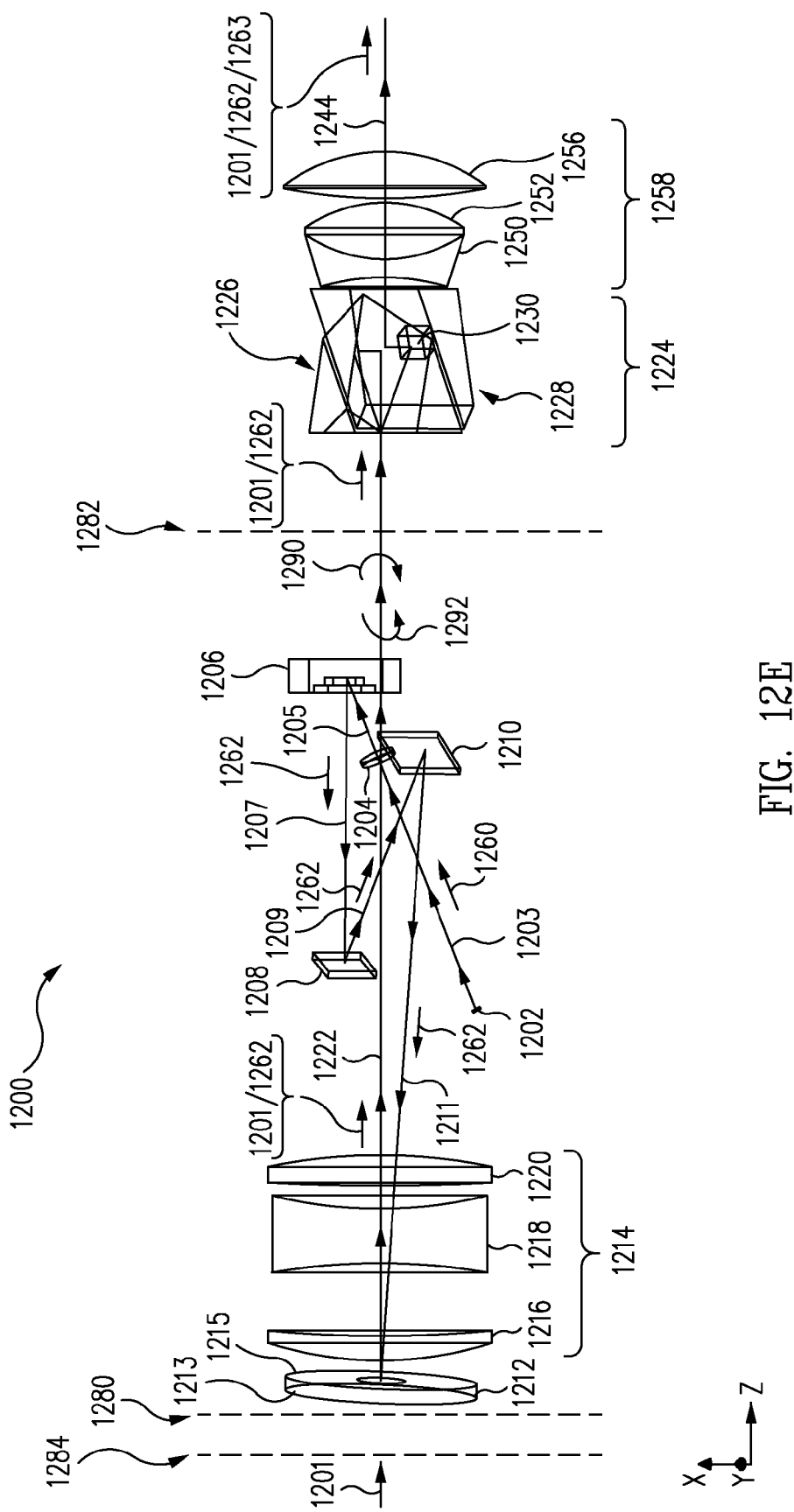

FIGS. 12A-J illustrate views of a sight system 1200 in accordance with various embodiments of the disclosure. In particular, FIG. 12A illustrates a perspective view of sight system 1200. FIG. 12B illustrates a side view of sight system 1200. FIGS. 12C, 12D, 12E, and 12F illustrate side views of sight system 1200 rotated from the view shown in FIG. 12B in the direction of an arrow 1290 about an optical axis 1222 by approximately 20 degrees, 45 degrees, 70 degrees, and 90 degrees, respectively. FIGS. 12G, 12H, 12I, and 12J illustrate side views of sight system 1200 rotated from the view shown in FIG. 12B in the direction of an arrow 1292 about optical axis 1222 by approximately 20 degrees, 45 degrees, 70 degrees, and 90 degrees, respectively. Accordingly, it will be appreciated that FIGS. 12F and 12J effectively provide top and bottom views, respectively, of sight system 1200. It will also be appreciated that some of the structures and annotations shown in various drawing views are omitted from some of the other drawing views for clarity of illustration.

Sight system 1200 may be selectively configured to operate in a variety of different modes including, for example, an occluded sight mode, a telescopic sight mode, or a mode providing thermal images, infrared images, low light images, or other images with or without reticles. Sight system 1200 may also be implemented to provide features of different modes simultaneously. Any of the various features of sight system 1200 or other sight systems described herein may be combined with each other where appropriate to provide sight systems configured to provide desired features.

In various embodiments, sight system 1200 may be implemented in addition to, or in place of, the various sight systems described herein and in accordance with various techniques described herein. For example, in one embodiment, sight system 1200 may be modified as may be appropriate to be mounted on rail 195 of rifle 190 substantially far away from user 105 (shown in FIG. 1A) in place of the various sight systems and/or cameras described herein. In another embodiment, sight system 1200 may be mounted on rail 191 of rifle 190 in place of or proximate to eyepiece 199 and substantially closer to user 105 than sight system 100. In one embodiment, sight system 1200 may be mounted on rail 191 or rail 195 in a manner that provides minute of angle (MOA) adjustments for azimuth and elevation (e.g., ¼ MOA increments or others).

In various embodiments, sight system 1200 may be aligned relative to a firearm (e.g., rifle 190) to aim the firearm. Advantageously, sight system 1200 may be selectively operated as a telescopic sight or an occluded sight while so aligned, and without requiring further alignment when switching between telescopic and occluded modes of operation. For example, a prism 1224 and a light source 1230 (further described herein) may be maintained in a fixed position relative to objective lens optics 1214 (further described herein). In this case, the reticle provided by light source 1230 may remain fixed relative to light 1201 (further described herein) provided from a scene. In one embodiment, sight system 1200 may be configured to accurately aim a firearm at close ranges while the reticle is superimposed on light 1201 from the scene for operation as a telescopic sight. Because prism 1224 and light source 1230 remain fixed, the firearm may continue to be accurately aimed without adjusting an orientation of prism 1224 when light 1201 is blocked (e.g., by shutter 1280 and/or shutter 1282 further described herein) while only the reticle remains viewable by the user for operation as an occluded sight. Various alignment techniques will be further discussed with regard to FIGS. 15-16 herein.

Referring now to generally to FIGS. 12A-J, sight system 1200 includes a light source 1202, a lens 1204, a display 1206, mirrors 1208 and 1210, a beam splitter 1212, objective lens optics 1214, prism 1224, light source 1230, an eyepiece 1258, shutters 1280 and 1282, and a filter 1284. The positions of the various illustrated components may be adjusted as may be desired in particular embodiments to satisfy desired form factors, packaging constraints, optical characteristics, and/or other factors.

One or more of beam splitter 1212, objective lens optics 1214, prism 1224, and eyepiece 1258 may be used to provide an optical system having optical axis 1222 (e.g., also referred to as a path or optical path) along which light 1201 from a scene (e.g., target scene 410 or others) and an image 1262 from display 1206 may be passed together for viewing by a user, such as user 105. In this regard, user 105 may view image 1262 provided by display 1206 superimposed on the scene.

Sight system 1200 may be configured to provide various combinations of images including images of a scene, reticles, and/or other visual information to user 105. In particular, sight system 1200 may be configured to selectively combine (e.g., superimpose or otherwise merge) light 1201 from a scene (e.g., scene views), image 1262 provided by display 1206, and/or a reticle provided as light 1263 (illustrated as a cone in FIG. 12B) by light source 1230. Such combinations may be achieved, for example, by selectively operating light source 1202, display 1206, light source 1230, shutter 1280, and/or shutter 1282.

In various embodiments, one or more of light source 1202, lens 1204, display 1206, mirrors 1208 and 1210, and beam splitter 1212 may be omitted or not used. For example, in one such embodiment, light 1201 passes along optical axis 1222 without image 1262. In this case, light 1201 and the reticle provided as light 1263 may be combined for viewing by user 105 through eyepiece 1258 to operate sight system 1200 as a telescopic sight without image 1262. In another such embodiment, shutter 1280 and/or shutter 1282 may be closed to prevent light 1201 from passing through prism 1224. In this case, light 1201 is blocked from being received by prism 1224, and only light 1263 is viewable by user 105 through eyepiece 1258 to operate sight system 1200 as an occluded sight without light 1201 and without image 1262.

In the initial description below, it is assumed that shutters 1280 and 1282 are open to pass light therethrough, and light source 1202, display 1206, and light source 1230 are all operating. Other configurations will be further described.

Sight system 1200 receives light 1201 (e.g., any form of electromagnetic radiation such as visible light, infrared light, or light of other wavelengths) from a scene. In one embodiment, light 1201 may pass through filter 1284 (e.g., an external filter, an internal filter, a coating, and/or a window). In this regard, various types of filters 1284 may be provided including, for example, laser blocking filters, honeycomb filters, or others.

While shutters 1280 and 1282 are open, light 1201 passes through beam splitter 1212 and objective lens optics 1214 along optical axis 1222 to prism 1224. In one embodiment, objective lens optics 1214 may include lens elements 1216, 1218, and 1220 which may be selected to correct for chromatic aberrations.

Display 1206 may be implemented using any desired size display and may be used to provide an image 1262 that may be selectively combined with light 1201 from the scene, light 1263 provided by light source 1230, and/or other visual information. For example, display 1206 may be an electronic display configured to receive image data through appropriate wired and/or wireless signals from various sensors, image capture devices (e.g., cameras and/or others), and/or other components further described herein. Such image data may be provided on display 1206 to provide image 1262.

Although image 1262 is generally referred to in the singular, in various embodiments, display 1206 may provide a series of images in the same manner as described herein with regard to image 1262. For example, display 1206 may provide a series of images that may be intermittently or continuously updated (e.g., a video feed, information that is updated, or other non-static images).

In one embodiment, display 1206 may be implemented as a DLP display having a DMD micromirror array that may be selectively arranged in response to the image data. In this regard, light source 1202 may provide light 1260 to display 1206 through a path 1203, a lens 1204 (e.g., which may collimate light 1260 in one embodiment or may be omitted in another embodiment), and a path 1205. The micromirror array of display 1206 may reflect light 1260 in a pattern corresponding to the image data to effectively project image 1262 along a path 1207.

In one embodiment, light source 1202 is a monochromatic light source such that image 1262 is likewise monochromatic. In another embodiment, multiple light sources 1202 may be provided with different wavelengths (e.g., red, green, and blue light in one embodiment). In this case, multiple light sources 1202 (e.g., laser light sources in one embodiment) may be focused on display 1206 through multiple lenses 1204.

Other types of displays 1206 are also contemplated. For example, in various embodiments, display 1206 may be implemented as one or more displays in accordance with any type of display described herein such as an LCD display, an OLED display, a plasma display, a CRT display, or another type of display as may be appropriate in particular applications. Accordingly, light source 1202 may be configured differently, positioned differently, or omitted in accordance with various display types.

Mirror 1208 receives image 1262 along path 1207 and reflects image 1262 to mirror 1210 along a path 1209. Mirror 1210 receives image 1262 and reflects image 1262 to beam splitter 1212 along a path 1211.

Beam splitter 1212 receives image 1262 reflects image 1262 to prism 1224 along optical axis 1222. In various embodiments, beam splitter 1212 may be implemented using any appropriate size. For example, although beam splitter 1212 has been illustrated with a diameter smaller than that of objective lens optics 1214, beam splitter 1212 may be implemented with a diameter that is substantially equal to or greater than that of objective lens optics 1214. In one embodiment, beam splitter 1212 may include one or more coatings or other reflective surfaces on a front side 1213, a back side 1215, and/or embedded within beam splitter 1212 to reflect a desired wavelength range corresponding to image 1262 (e.g., corresponding to a wavelength range of light source 1202). In another embodiment, beam splitter 1212 may be similarly configured to reflect light in several narrow wavelength ranges corresponding to wavelength ranges of multiple light sources 1202 if provided.

In view of the above, it will be appreciated that light 1201 from the scene and image 1262 are both passed from beam splitter 1212 and objective lens optics 1214 along optical axis 1222 as shown. Thus, beam splitter 1212 may effectively operate as a beam combiner to superimpose light 1201 from the scene and image 1262 on each other and pass the combination thereof along optical axis 1222 to prism 1224.

One or more of the various paths identified in FIGS. 12A-J may be selected such that light 1201 and image 1262 are in focus with each other. For example, in one embodiment, paths 1207, 1209, and 1211 may be selected such that image 1262 may be focused at infinity when received by beam splitter 1212. In this case, if the scene is located substantially far away from sight system 1200, then light 1201 may be effectively focused at infinity when received by beam splitter 1212 and thus may be in focus with image 1262.

While shutter 1282 is open, prism 1224 receives the combination of light 1201 and image 1262 from beam splitter 1212 along optical axis 1222. In one embodiment, prism 1224 may be implemented as a Schmidt-Pechan prism including a Schmidt prism 1226 and a Pechan prism 1228 separated by an air gap 1227. In this configuration, prism 1224 may effectively rotate light 1201 (e.g., including reinverting light 1201 to compensate for inversion caused by other components of the optical system) and image 1262 by approximately 180 degrees.

Figure 12F:
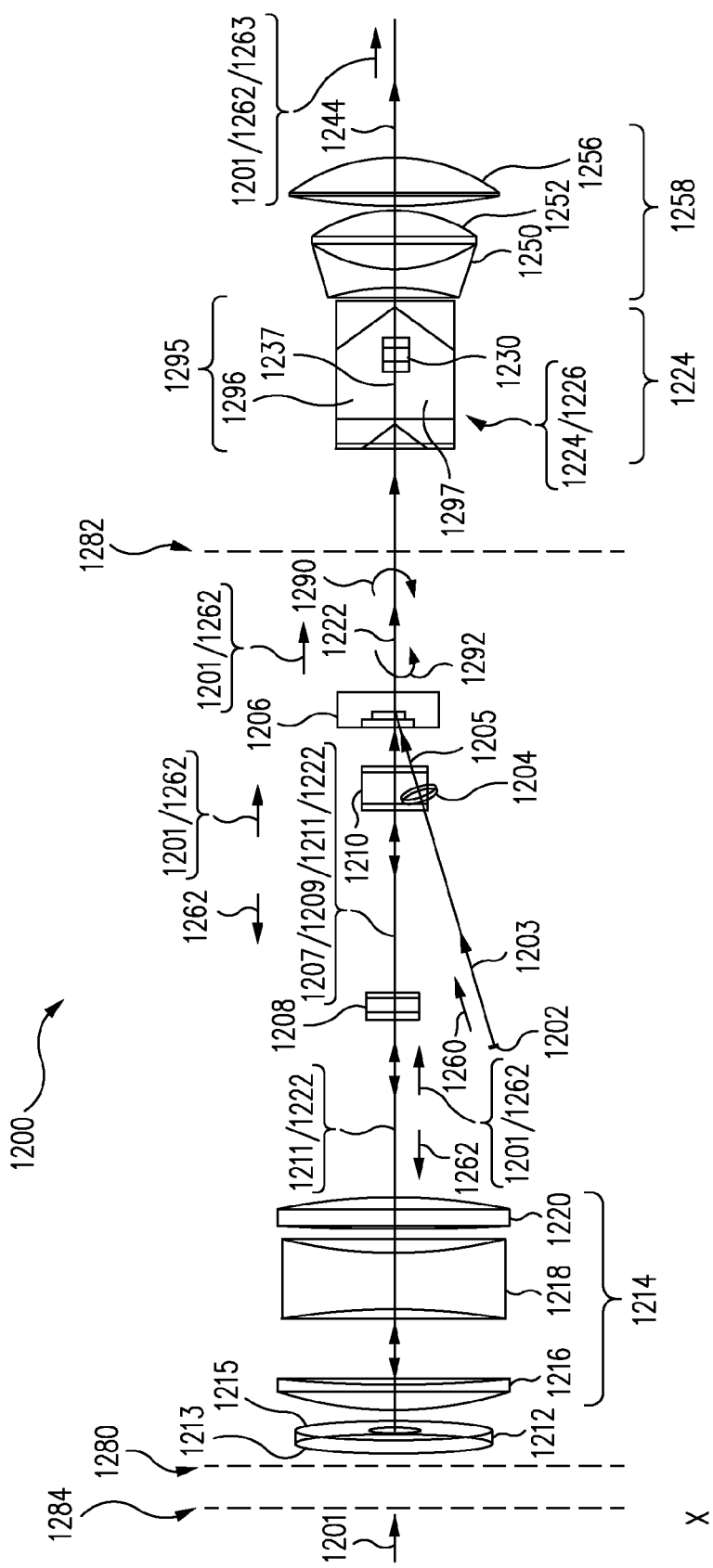
Figure 12G:
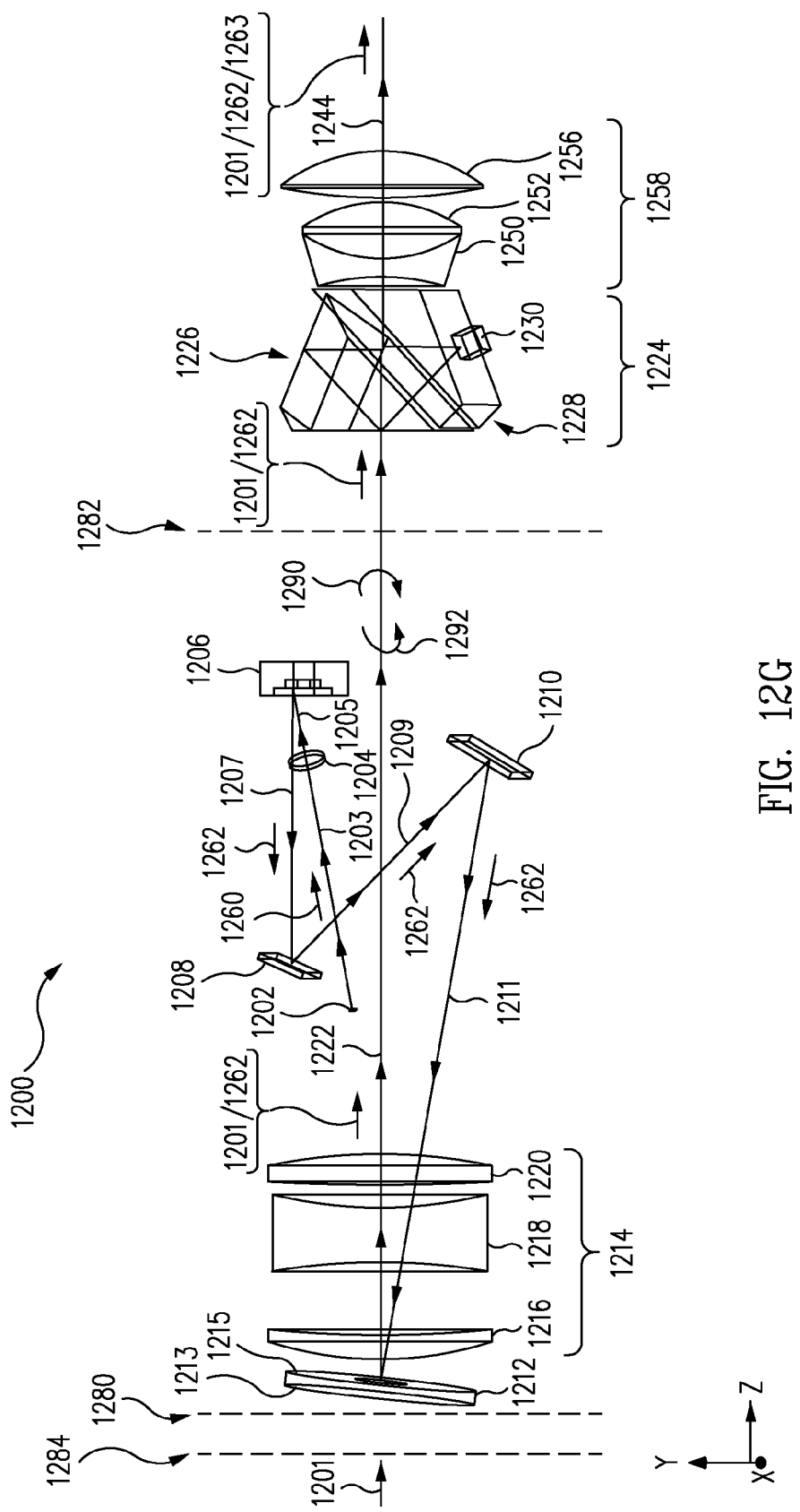
Figure 12H:
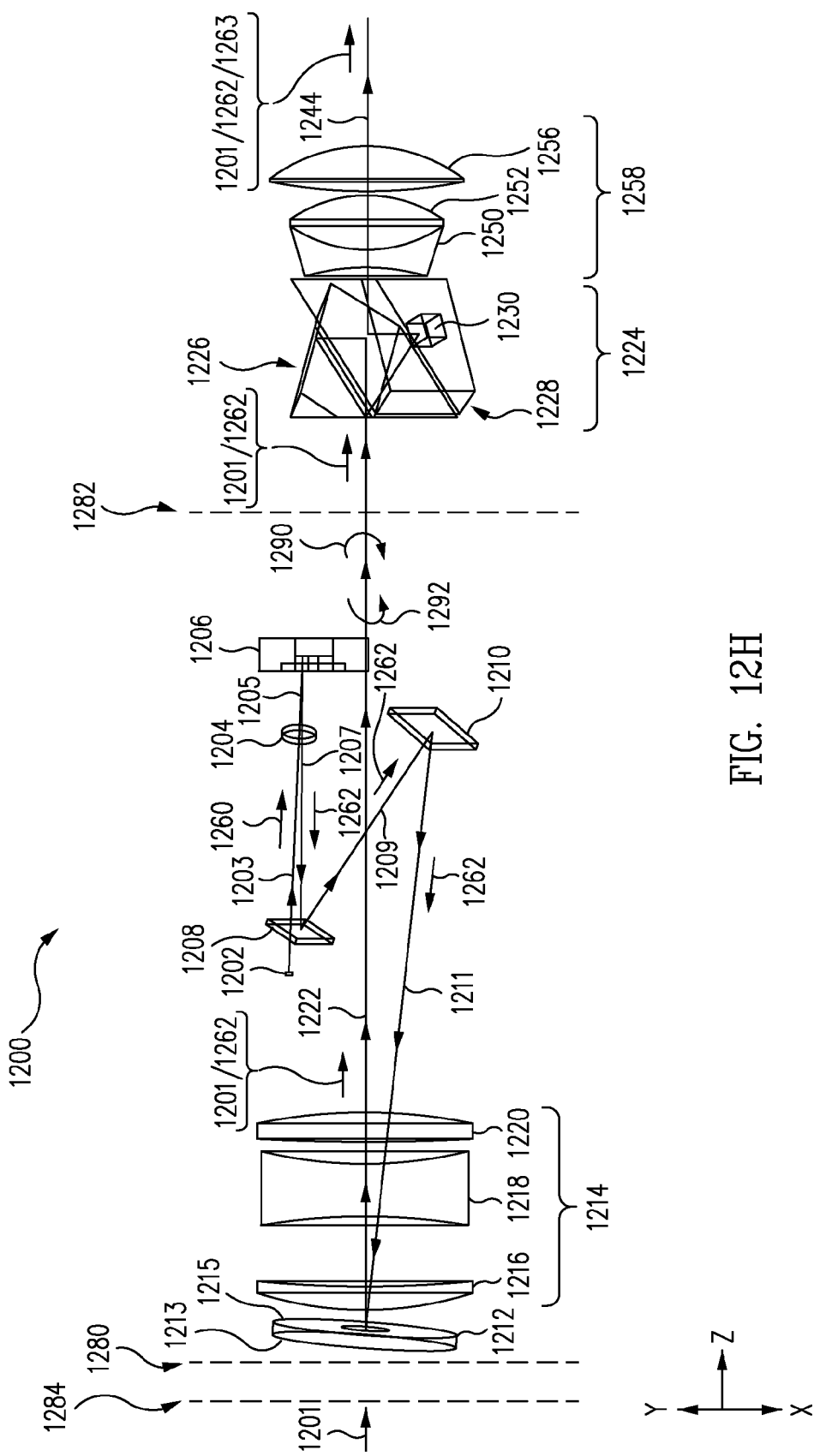
Figure 12I:
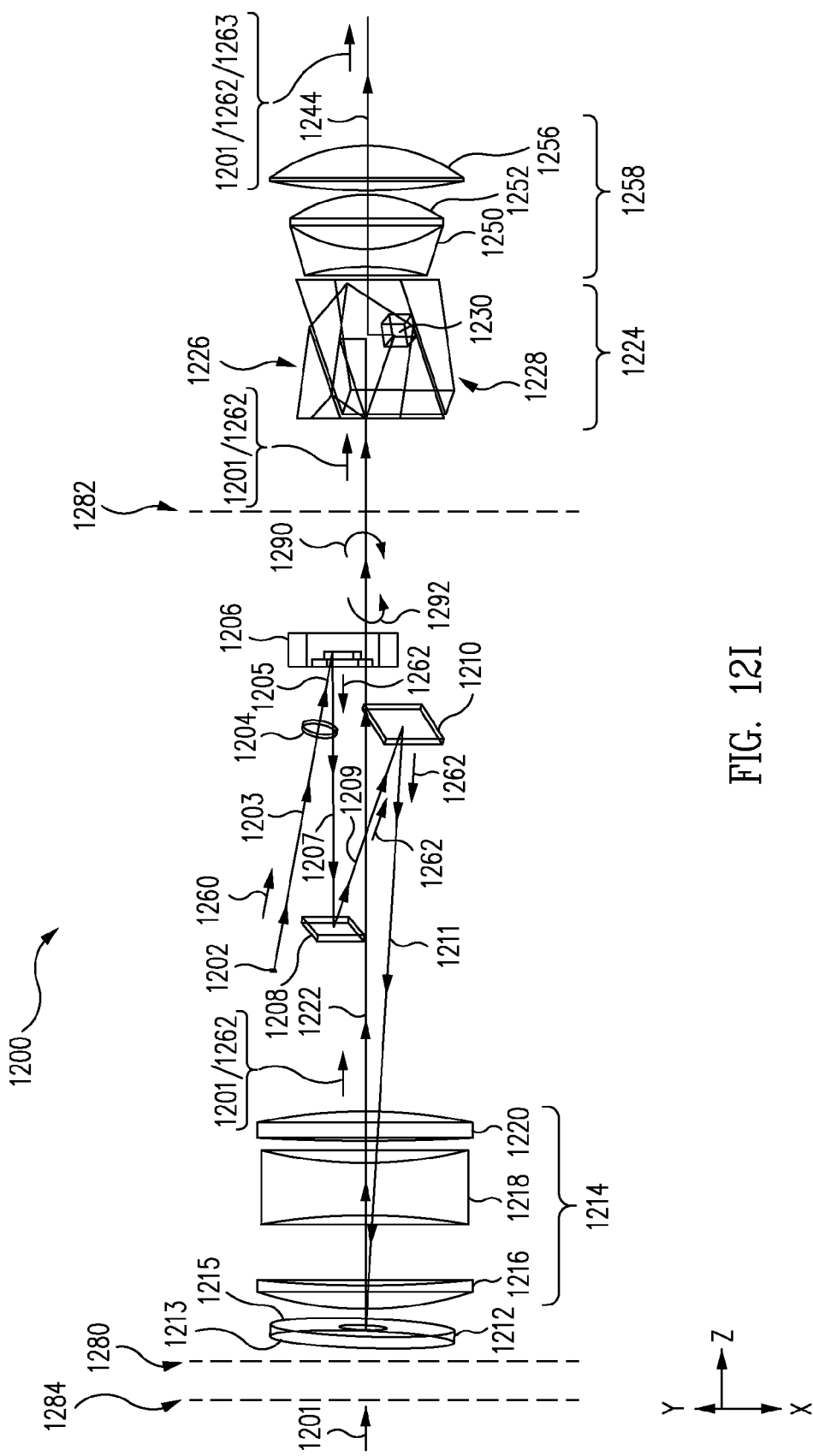
Figure 12J:
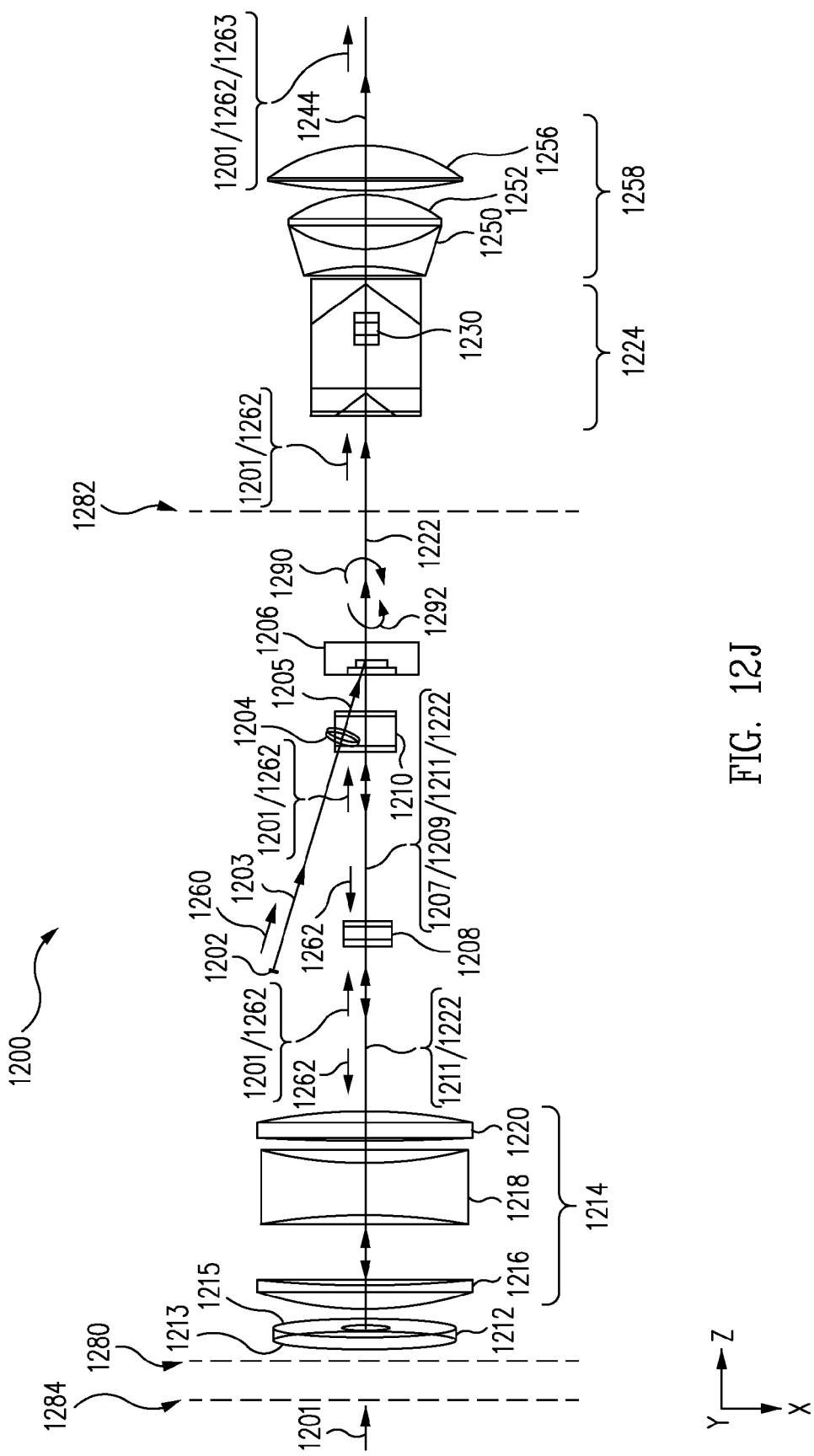

Light 1201 and image 1262 reflect off of surfaces 1235, 1239, 1232, 1243, 1296, and 1297 of prism 1224 and pass along paths 1236, 1238, 1240, 1242, and 1244 (see FIGS. 12B and 12F). Prism 1226 has a roof 1295 including surfaces 1296 and 1297 that intersect (e.g., meet) to define a peak 1237 (see FIGS. 12B and 12F). In various embodiments, one or more phase coatings may be provided on surfaces 1296 and 1297 to prevent inadvertent polarization of light 1201 and image 1262 as they reflect off of surfaces 1296 and 1297 when transitioning from path 1236 to path 1238. The combination of light 1201 and image 1262 pass along path 1244 through eyepiece 1258 and on to a user, such as user 105.

Eyepiece 1258 may include lens elements 1250, 1252, and 1256. In FIG. 12B, lens elements 1250 and 1252 are affixed (e.g., glued) to each other. In various embodiments, any of lens elements 1250, 1252, and 1256 may be affixed to each other or separated from each other. In one embodiment, eyepiece 1258 may be implemented as a large aperture eyepiece (e.g., having approximately 1.0 inch diameter) configured to provide a plane wave with high accuracy (e.g., with approximately 5 MOA and less than 2 MOA error).

The optical system provided by sight system 1200 may magnify the field of view of the scene provided by light 1201 to provide a telescopic sight. For example, in one embodiment, light 1201 may correspond to an approximately 5 degree field of view of the scene. In this case, objective lens optics 1214 may have a focal length of approximately 174 mm, and eyepiece 1258 may have a focal length of approximately 29 mm As such, the optical system of sight system 1200 may effectively magnify the scene by a power of approximately 6 (e.g., corresponding to the ratio of the approximately 174 mm and approximately 29 mm focal lengths). Accordingly, the approximately 5 degree field of view of the scene may be perceived as approximately 30 degrees when viewed by user 105 through eyepiece 1258. In another embodiment, objective lens optics 1214 may have a focal length of approximately 116 mm and eyepiece 1258 may have a focal length of approximately 29 mm to effectively magnify the scene by a power of approximately 4 (e.g., corresponding to the ratio of the approximately 116 mm and approximately 29 mm focal lengths). Other amounts and/or types of magnification may be provided in various embodiments. For example, it is contemplated that magnification may be performed by using digital or optical zoom techniques for one or more cameras or other image capture devices to provide zoomed images from display 1206.

In addition to performing rotation, prism 1224 may also be used to superimpose a reticle onto light 1201 and image 1262. In this regard, prism 1224 may effectively operate as a beam combiner to combine a reticle with light 1201 and image 1262. For example, light source 1230 may be configured to project light 1263 (illustrated as a cone in FIG. 1213) into prism 1224. Light 1263 may pass along path 1242 with light 1201 and image 1262, reflect off of surface 1243 with light 1201 and image 1262, and pass along path 1244 through eyepiece 1258 with light 1201 and image 1262.

In one embodiment, surface 1232 of prism 1224 may be partially or substantially coated (e.g., with an aluminum or an appropriately protected silvered surface or other type) to reflect light received from path 1240 to path 1242. An aperture 1231 (e.g., an uncoated portion) may be provided on surface 1232 through which light source 1230 may project light 1263 into prism 1224. In one embodiment, aperture 1231 may be used to focus or otherwise aim light 1263 substantially along path 1242. For example, in one embodiment, aperture 1231 may delimit light 1263 at surface 1232 to approximately 40 microns in diameter, which when viewed at infinite conjugate through eyepiece 1258 (e.g., having a 29 mm focal length in this embodiment) yields visual rays of approximately 5 MOA extent. Light 1201 and image 1262 provided along path 1240 may reflect off of the coated portion of surface 1232 and pass along path 1242 with light 1263.

In one embodiment, at least a portion of surface 1243 of prism 1224 may be coated (e.g., with an aluminum or an appropriately protected silvered surface or other type) to reflect light received from path 1242 to path 1244. Such a coating may extend beyond the intersection of paths 1242 and 1244 to reflect a sufficient amount of the cone provided by light 1263, but without covering the entirety of surface 1243 so as to permit light along path 1240 to pass (e.g., transmit) through surface 1243.

In one embodiment, eyepiece 1258 may collimate light 1263 such that light 1263 appears substantially as a dot superimposed on the view of the scene provided by light 1201 and image 1262 provided by display 1206. Light source 1230 may be implemented to project light 1263 at any desired wavelength range. For example, in one embodiment, light source 1230 may project visible red light 1263 to provide a red dot reticle superimposed on the composite images. Other colors and wavelength ranges are also contemplated for light source 1230 and light 1263.

Figure 13A:
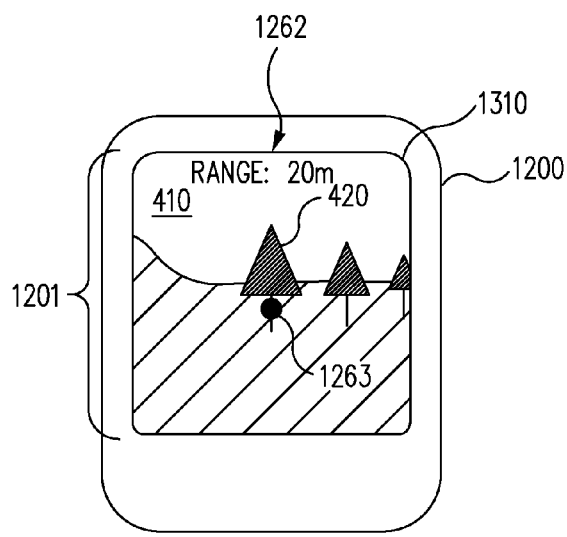
FIG. 13A illustrates a view of the target scene of FIG. 4 using a sight system to provide a telescopic sight with an image of the target scene, an additional image provided by a display, and a reticle provided by a light source in accordance with an embodiment of the disclosure.

Various components of sight system 1200 may be selectively operated to provide different images to user 105. For example, FIG. 13A illustrates a view of target scene 410 of FIG. 4 using sight system 1200 to provide a telescopic sight with an image 1310 that includes a view of target scene 410 provided by light 1201, information provided by image 1262, and a reticle provided by light 1263 in accordance with an embodiment of the disclosure. In this case, shutters 1280 and 1282 are both open, and light source 1202, display 1206, and light source 1230 are all operating.

Light 1201 is received by beam splitter 1212. Light source 1202 and display 1206 are operated to provide image 1262 having information that illustrates range information (e.g., provided by an appropriate rangefinder) for target 420 in target scene 410 in this embodiment. Beam splitter 1212 combines light 1201 and image 1262 and provides the combination thereof along optical axis 1222 to prism 1224. Although image 1262 in this case includes range information located at only a top portion of the user view, image 1262 may include any desired information or image content and may overlap with any portion of the view of target scene 410 provided by light 1201.

Light source 1230 projects light 1263 to provide a reticle (e.g., a dot in this case). Prism 1224 combines light 1201, image 1262, and light 1263 to provide image 1310 (e.g., a combined or composite image) which may be viewed by user 105 through eyepiece 1258.

Thus, in the embodiment shown in FIG. 13A, sight system 1200 is operated as a telescopic sight that superimposes information (image 1262) and a reticle (light 1263) over a scene (light 1201). In another embodiment, the reticle may be provided as part of image 1262. In this regard, light source 1230 may be turned off and the reticle may instead be provided by display 1206.

Figure 13B:
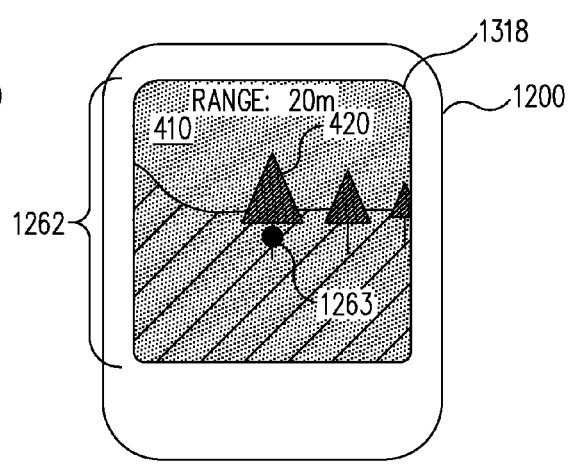
FIG. 13B illustrates a view of the target scene of FIG. 4 using a sight system to provide a telescopic sight with an image provided by a display and a reticle provided by a light source in accordance with an embodiment of the disclosure.

As another example, FIG. 13B illustrates a view of target scene 410 of FIG. 4 using sight system 1200 to provide a telescopic sight with an image 1318 that includes a view of target scene 410 and information both provided by image 1262, and a reticle provided by light 1263 in accordance with an embodiment of the disclosure. In this case, shutter 1280 is closed, shutter 1282 is open, and light source 1202, display 1206, and light source 1230 are all operating.

While shutter 1280 is closed, light 1201 is blocked from the optical system of sight system 1200. As a result, only image 1262 provided by display 1206 and the reticle provided by light 1263 are visible to user 105 in this embodiment.

In this case, image 1262 includes an image of target scene 410 provided by an image capture device such as a camera (e.g., an infrared camera, thermal camera, low light camera, or others). For example, sight system 1200 may be configured to interface with any of the various types of cameras described herein to receive images of target scene 410 or other locations as may be desired in particular implementations. Such configurations may be particularly useful in situations where sight system 1200 may be used for aiming at targets at night, in low light, or in other conditions where visibility is compromised. Accordingly, in FIG. 13B, image 1262 appears shaded to simulate an infrared, thermal, or low light image. Image 1262 further includes range information as described.

Thus, display 1206 may effectively provide a composite image 1262 that includes an image of a scene provided by an image capture device with further information overlaid (e.g., superimposed) thereon. Image 1262 is passed through objective lens optics 1214 along optical axis 1222 to prism 1224 where it is combined with light 1263 to provide image 1318 which may be viewed by user 105 through eyepiece 1258.

Thus, in the embodiment shown in FIG. 13B, sight system 1200 is operated as a telescopic sight that provides image 1318 including image 1262 from display 1206 (including a scene image and range information) and a reticle provided by light 1263. In another embodiment, the reticle may be provided as part of image 1262. In this regard, light source 1230 may be turned off and all of image 1318 may be provided by image 1262.

Figure 13C:
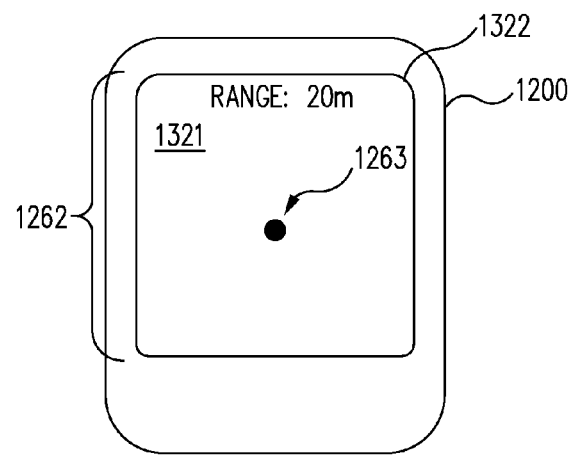
FIG. 13C illustrates a view of the target scene of FIG. 4 using a sight system to provide an occluded sight with an image provided by a display and a reticle provided by a light source in accordance with an embodiment of the disclosure.

As another example, FIG. 13C illustrates a view of target scene 410 of FIG. 4 using sight system 1200 to provide an occluded sight with an image 1320 that includes information provided by image 1262 and a reticle provided by light 1263 in accordance with an embodiment of the disclosure. In this case, shutter 1280 is closed, shutter 1282 is open, and light source 1202, display 1206, and light source 1230 are all operating.

As discussed, while shutter 1280 is closed, light 1201 is blocked from the optical system of sight system 1200. As a result, only image 1262 provided by display 1206 and the reticle provided by light 1263 are visible to user 105 in this embodiment.

Image 1262 includes range information as described. In this embodiment, no image signal from a camera or other image capture device is provided to display 1206. As a result, image 1262 includes the range information on a dark or opaque background 1321.

Image 1262 is passed through objective lens optics 1214 along optical axis 1222 to prism 1224 where it is combined with light 1263 to provide image 1322 which may be viewed by user 105 through eyepiece 1258.

Thus, in the embodiment shown in FIG. 13C, sight system 1200 is operated as an occluded sight that superimposes information provided in image 1262 and a reticle provided by light 1263 over background 1321. In another embodiment, the reticle may be provided as part of image 1262. In this regard, light source 1230 may be turned off and all of image 1322 may be provided by image 1262.

As another example, sight system 1200 may be operated to provide an occluded sight in the manner of FIG. 6 previously described herein. In this case, shutters 1280 and 1282 are closed, light source 1230 is operating, and light source 1202 and display 1206 are turned off. While shutters 1280 and 1282 are closed, light 1201 is blocked from the optical system of sight system 1200 and any image 1262 provided by display 1206 is blocked from entering prism 1224. As a result, only the reticle provided by light 1263 will be visible to user 105 and will appear as reticle 430 in the manner shown in FIG. 6. In another embodiment, one or more of light source 1202, lens 1204, display 1206, mirrors 1208 and 1210, and beam splitter 1212 may be omitted or not used to provide the same or similar occluded sight operation.

Although two shutters 1280 and 1282 have been described as operating between open and closed positions and implemented in particular locations in sight system 1200, any desired number of shutters may be provided at any desired locations to selectively adjust the images viewed by user 105. For example, in one embodiment, shutter 1280 may be provided where shown in FIG. 12B and shutter 1282 may be omitted. In this case, sight system 1200 may still be configured to provide any of the various types of views shown in FIGS. 13A-C, as shutter 1282 was described as being open for such views. Other positions, locations, and configurations are also contemplated.

Although a reticle in the form of a dot is shown in FIGS. 13A-C, one or more reticles of any desired shape, size, and/or color may be provided in various embodiments. For example, reticles in the form of one or more dots, crosshairs, diamonds, chevrons, marks, or other appropriate shapes are also contemplated.

Figure 14:
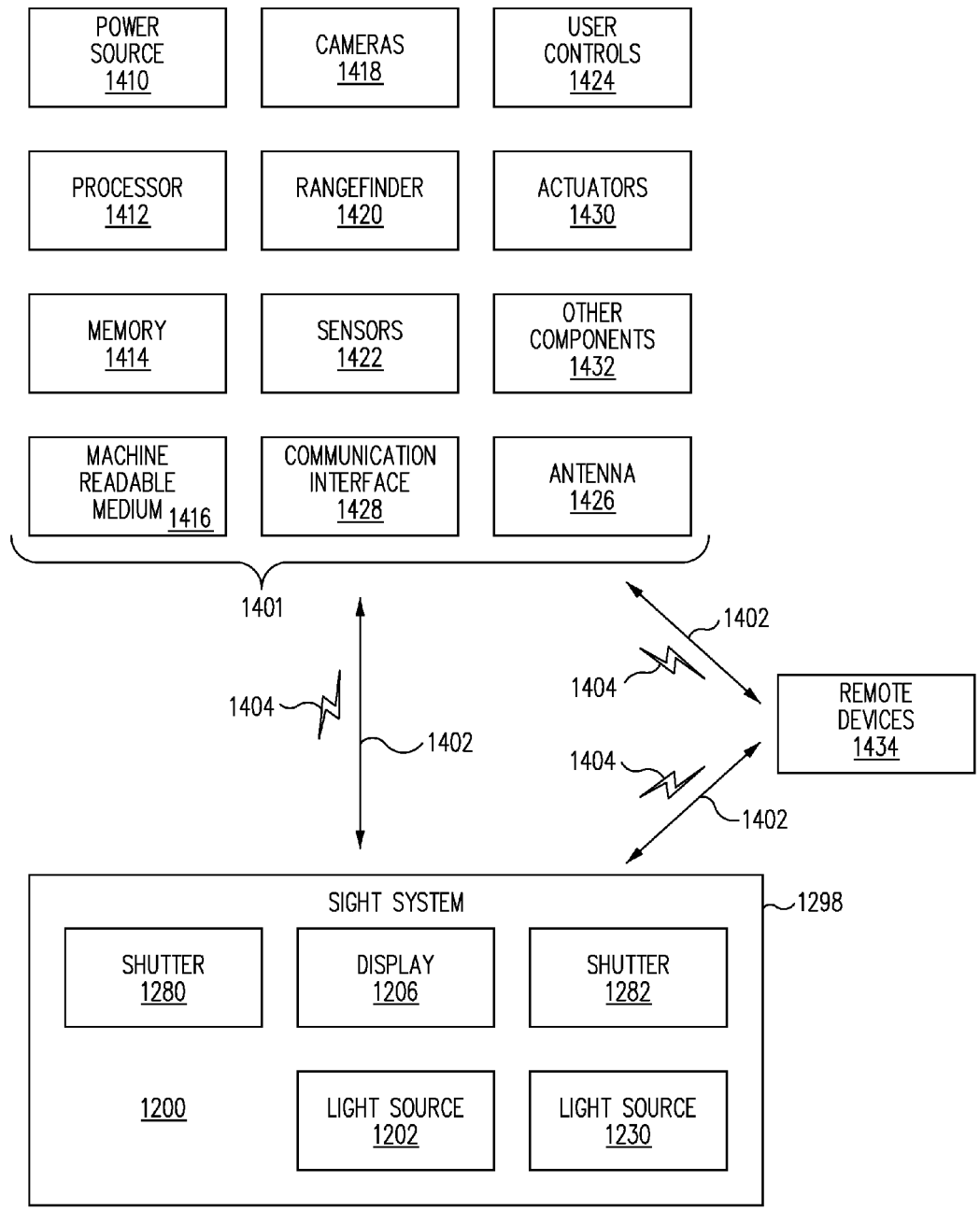
FIG. 14 illustrates a block diagram of several components that may be used with a sight system in accordance with an embodiment of the disclosure.

Referring now to FIG. 14, sight system 1200 may include a housing 1298 with various components positioned therein. It will be appreciated that only a subset of previously discussed components of sight system 1200 are shown in FIG. 14 in block diagram form, and any of the components of sight system 1200 described herein may be positioned inside or outside of housing 1298 as desired.

FIG. 14 also illustrates several components 1401 that may be used with sight system 1200 or other sight systems described herein in various embodiments. Components 1401, components of sight system 1200, and/or one or more remote devices 1434 may interface, communicate, and/or otherwise connect with each other, through, for example, wired connections 1402 and/or wireless connections 1404. Although components 1401 are illustrated separately from sight system 1200, any of components 1401 may be provided as part of sight system 1200 (e.g., inside or outside of housing 1298), co-located with sight system 1200, and/or provided separately from sight system 1200 as may be desired in various implementations. Remote devices 1434 (e.g., other sight systems 1200 or other devices) may communicate with sight system 1200 and/or components 1401 as described herein.

Components 1401 include a power source 1410, a processor 1412, a memory 1414, a machine readable medium 1416, cameras 1418, a rangefinder 1420, sensors 1422, user controls 1424, an antenna 1426, a communication interface 1428, actuators 1430, and other components 1432.

Power source 1410 may be used to power the various electrical components of sight system 1200 or components 1401. In one embodiment, power source 1410 may be implemented by one or more rechargeable or non-rechargeable batteries (e.g., 3×123A batteries, 6×AA batteries, or others). In another embodiment, power source 1410 may be a non-battery power source.

Processor 1412 may be implemented as one or more processors (e.g., general purpose processors, dedicated processors, logic, programmable logic devices (PLDs), and/or others) used to execute instructions (e.g., software, program code, microcode, or other instructions) stored in one or more memories 1414 and/or one or more machine readable mediums 1416 to control the operation of any of the various components of sight system 1200 and/or components 1401 to operate in accordance with various techniques described herein.

One or more cameras 1418 and/or other types of image capture devices may be provided in accordance with the various types of cameras and devices described herein. Cameras 1418 may be used to capture images of a scene to be projected or otherwise displayed by display 1206. In one embodiment, such images may be provided to processor 1412 for further manipulation before being displayed on display 1206. Processor 1412 may also provide other information on such images based on data provided by rangefinder 1420, sensors 1422, and/or other devices.

One or more rangefinders 1420 may be used to determine the range of desired targets (e.g., target 420 as shown in FIGS. 13A-C). Such range information may be provided to processor 1412 to generate an image to be displayed by display 1206 that includes the range information.

In one embodiment, processor 1412 may receive range information detected by rangefinder 1420 and adjust the position of a reticle provided in image 1262 in response thereto. In this regard, as discussed, a reticle may be provided as part of image 1262. The position of the reticle may be adjusted based on the detected range information to compensate for gravity effects such that user 105 may confidently aim at target 420 with the reticle positioned thereon without requiring user 105 to compensate for such gravity effects.

In one embodiment, rangefinder 1420 may be implemented as a laser rangefinder using single pulses or multiple pulses (e.g., pulsed at approximately 840 Hz in one embodiment) to determine range. Such a laser may also be used for pointing and/or aiming at areas of interest (e.g., targets) in a scene to provide user 105 with visual feedback to identify a current target. In one embodiment, such a laser may be implemented with a wavelength greater than approximately 1.5 microns (e.g., near-infrared) such that the laser may not be visible to unaided parties, but may be visible to user 105 when viewing infrared images provided by display 1206 that have been captured by an infrared camera (e.g., one of cameras 1418) and appropriately processed.

One or more sensors 1422 may be used to detect various conditions to provide information for use by sight system 1200 and/or components 1401. Sensors 1422 may include, for example, one or more detectors, accelerometers (e.g., X, Y, and Z accelerometers), gyroscopes, temperature sensors, air pressure sensors, wind sensors, humidity sensors, elevation sensors, depression sensors, tilt sensors, azimuth (e.g., from true north) sensors, thermal sensors, infrared sensors, global positioning system (GPS) receivers and/or transmitters, and/or others.

In various embodiments, information from one or more sensors 1422 may be processed by processor 1412 and used to determine the information displayed to user 105 as part of image 1262. For example, in one embodiment, environmental conditions may be provided as part of image 1262. In another embodiment, sensor information may be used by processor 1412 to adjust the position of a reticle when provided in image 1262 (e.g., to compensate for range and/or windage).

In various embodiments, sensors 1422 may communicate with one or more remote devices 1434 (e.g., through antenna 1426 and/or communication interface 1428). In one embodiment, display 1206 may display information received from such remote devices 1434 such as, for example, position information for remote devices 1434. For example, in one embodiment, information (e.g., a marker such as a circle, triangle, square, or other indicia) may be provided in image 1262 to indicate that a party of interest (e.g., a threat, a friendly party, and/or one of remote devices 1434) is in a scene (e.g., within the field of view of objective lens optics 1214 and/or one or more of cameras 1418). In another embodiment, if the party of interest is not in the scene, information (e.g., an arrow or other indicia) may be provided in image 1262 to indicate the direction in which sight system 1200 should be moved to view the party of interest.

Any desired information may be provided in image 1262 in response to any of components 1401 and/or remote devices 1434 including, for example, the status of power source 1410, locations marked by user 105, locations of other parties, images and/or messages received over antenna 1426 and/or communication interface 1428, text messages, and/or other information. In this regard, processor 1412 may generate image 1262 in response to such information and provide image data to display 1206 to display image 1262.

One or more user controls 1424 may be implemented by, for example, pistol grip controls, remote pads, cable connected switches, buttons, knobs, and/or other types of user controls described herein. User controls 1424 may be mechanical and/or electrical controls used to adjust the operation of sight system 1200 in accordance with the various techniques and implementations described herein with regard to other user controls. In one embodiment, user controls 1424 may be used to adjust the intensity (e.g., brightness) of light source 1202, display 1206, and/or light source 1230. User controls 1424 may also be used to manually enter information that may be processed by processor 1412 for use in generating image 1262 and/or performing other operations of sight system 1200 and/or components 1401.

One or more antennas 1426 and communication interfaces 1428 may be provided to perform data communications between various components of sight system 1200, components 1401, and/or remote devices 1434. Such communications may include, for example, radio frequency communications, Bluetooth™ communications, GPS communications, and/or others.

One or more actuators 1430 may be provided to selectively operate shutters 1280 and 1282. For example, in one embodiment, actuators 1430 may be electrically operated actuators configured to selectively open and close shutters 1280 and 1282 in response to processor 1412 and/or user controls 1424. In another embodiment, actuators 1430 may be mechanically operated actuators configured to selectively open and close shutters 1280 and 1282 in response to processor 1412 and/or user controls 1424.

One or more other components 1432 may also be provided to provide other features as may be desired in various embodiments.

Figure 15:
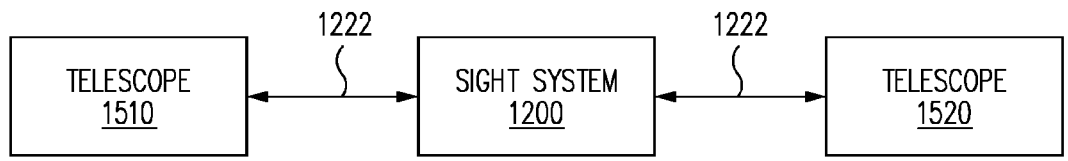
FIG. 15 illustrates a block diagram of a sight system undergoing an alignment in accordance with an embodiment of the disclosure.
Figure 16:
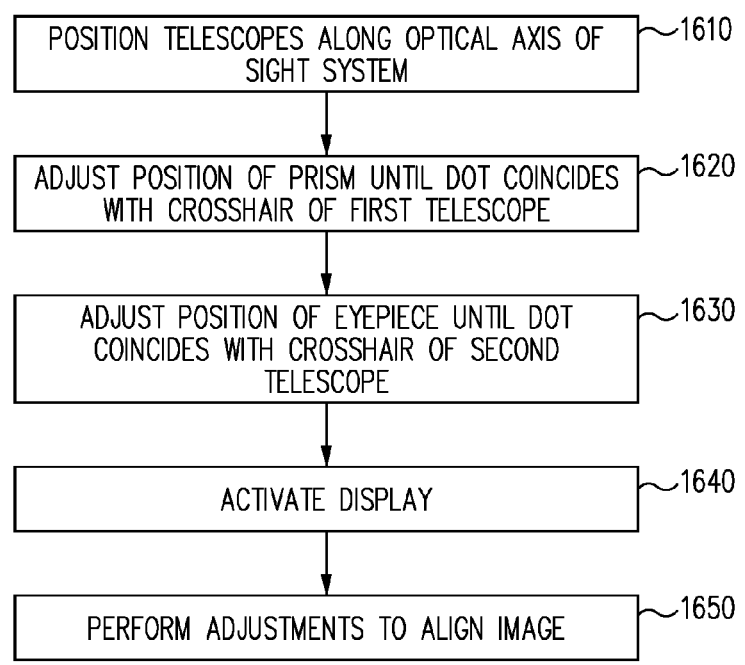
FIG. 16 illustrates a process to align a sight system in accordance with an embodiment of the disclosure.

Various components of sight system 1200 may be aligned to ensure that sight system 1200 is accurately aimed. In this regard, FIG. 15 illustrates a block diagram of sight system 1200 undergoing an alignment in accordance with an embodiment of the disclosure, and FIG. 16 illustrates a process to align sight system 1200 in accordance with an embodiment of the disclosure. The alignment operations discussed with regard to FIGS. 15-16 may be performed, for example, as part of factory manufacturing and/or testing processes for sight system 1200.

First and second telescopes 1510 and 1520 may be positioned on either side of sight system 1200 and along optical axis 1222 (block 1610). Telescope 1510 may be positioned to view objective lens optics 1214 such that looking through telescope 1510 permits an operator (e.g., a human being or a system) to view objective lens optics 1214 along optical axis 1222. Telescope 1520 may be positioned to view eyepiece 1258 such that looking through telescope 1520 permits an operator (e.g., a human being or a system) to view eyepiece 1258 along optical axis 1222. Accordingly, it will be appreciated that sight system 1200 as shown in FIG. 15 may be oriented in the manner shown in FIG. 12B with objective lens optics 1214 disposed substantially toward telescope 1510, and eyepiece 1258 disposed substantially toward telescope 1520.

Each of telescopes 1510 and 1520 may be equipped with a crosshair or other appropriate reticle or marker located at the precise center of the field of view perceived by telescopes 1510 and 1520 and aligned with optical axis 1222. In one embodiment, telescopes 1510 and 1520 may be focused at infinity.

During blocks 1620 and 1630, light source 1230 may be on (e.g., activated) to project light 1263 into prism 1224 which may pass light 1263 out of each end of sight system 1200 to telescopes 1510 and 1520 where light 1263 may be perceived as a dot (e.g., a red dot in one embodiment). In block 1620, the position of prism 1224 may be adjusted (e.g., in left, right, up, and/or down movements without tilting or rotating prism 1224 in one embodiment) until the dot coincides with the crosshair of telescope 1510 (e.g., when viewed by telescope 1510). Accordingly, following block 1620, prism 1224 and objective lens optics 1214 may be properly aligned relative to each other.

In block 1630, the position of eyepiece 1258 may be adjusted (e.g., in left, right, up, and/or down movements without tilting or rotating eyepiece 1258 in one embodiment) until the dot coincides with the crosshair of telescope 1520 (e.g., when viewed by telescope 1520). Accordingly, following block 1630, eyepiece, 1258, prism 1224, and objective lens optics 1214 may be properly aligned relative to each other.

In block 1640, display 1206 is turned on or otherwise activated to provide image 1262. As discussed, image 1262 may include a reticle that may be used for aiming sight system 1200, and image 1262 may be passed by various components of sight system 1200 to permit image 1262 to be viewed through eyepiece 1258. Accordingly, in this embodiment, image 1262 may be viewed by telescope 1520.

In block 1650, adjustments may be performed until image 1262 is aligned as perceived by telescope 1520. In various embodiments, such adjustment may be performed by adjusting the position of the reticle within image 1262 and/or adjusting the position of display 1206, mirror 1208, mirror 1210, and/or beam splitter 1212 until the reticle of image 1262 coincides with the crosshair of telescope 1520 and/or the dot provided by light 1263. Accordingly, following block 1650, image 1262 may be aligned to permit image 1262 to be used to aim sight system 1200 for short range shooting. The position of the reticle in image 1262 may be subsequently adjusted as desired to align the reticle for long range shooting.

Other embodiments are also contemplated. For example, in one embodiment, any of the optics described herein may include aspherical lenses to correct for possible spherical aberrations in the optical paths of any of the sight systems described herein.

Any of the various sight systems described herein may be operated as telescopic sights, reflex sights, reflective sights, occluded sights, and/or other types of sights where appropriate.

In another embodiment, a sight system in accordance with one or more embodiments described herein may be configured to operate with a targeting system to facilitate weapons training In this regard, one or more electromagnetic signal sources (e.g., light sources) may be provided on a firearm and/or compatible targets to facilitate the transmission of signal to and/or from the firearm and such compatible targets to detect when a target has been hit. Advantageously, a camera of the sight system may be used to provide a record of the target as viewed by a user at the time that the firearm is fired in a dry fire and/or live fire manner.

In another embodiment, images may be transmitted from the camera in a wired and/or wireless manner to other devices such as components of a targeting system for training and/or recording purposes.

In yet another embodiment, any of the sight systems described herein may be implemented with an optical path extending through the sight system to provide user 105 with an unobstructed view (e.g., an unobstructed optical path) of a target scene while looking down barrel 196 of rifle 190 without relying on images provided by a camera. For example, an unobstructed optical path may be provided that remains available for viewing by user 105 without requiring any components of the sight systems to be moved. As another example, various components of the sight systems described herein may be implemented to move (e.g., through manual or motorized operation) out of the way to provide an unobstructed optical path for user 105.

Although various sight systems have been described with regard to rifle 190, it will be appreciated that such sight systems may be used with any type of firearm or other device where appropriate. For example, it is contemplated that such sight systems may be used with other types of firearms, rifles, weapons, or apparatus as may be desired for various applications (e.g., small arms weapons, infantry support weapons, fortification weapons, vehicles, or others weapons or apparatus). Other types of applications, such as photography, measurement, or other applications are also contemplated.

Where applicable, the various components set forth herein may be combined into composite components and/or separated into sub-components without departing from the spirit of the present disclosure. Similarly, where applicable, the ordering of various steps described herein may be changed, combined into composite steps, and/or separated into sub-steps to provide features described herein.

Software in accordance with the present disclosure, such as non-transitory program code and/or data, may be stored on one or more non-transitory machine readable mediums. It is also contemplated that software identified herein may be implemented using one or more general purpose or specific purpose computers, computer systems, processors, and/or other appropriate hardware, networked and/or otherwise.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A sight system comprising:
   an optical system having an optical axis and adapted to receive light from a scene;
   an electronic display adapted to provide an image to the optical system along a first axis different from the optical axis;
   a first light source adapted to illuminate the electronic display to provide the image;
   wherein the optical system is adapted to pass the scene light and the image along the optical axis to superimpose the image on the scene light;
   a prism adapted to receive the superimposed image and the scene light along the optical axis;
   a second light source adapted to project additional light into the prism along a second axis different from the optical axis and the first axis to superimpose a reticle on the scene light;
   wherein the prism is adapted to pass the superimposed image, the superimposed reticle, and the scene light for viewing by a user of the sight system; and
   wherein the image comprises an infrared image of the scene, a thermal image of the scene, or a low light image of the scene received from a camera.

2. The sight system of claim 1, wherein the optical system comprises a beam splitter adapted to:
   pass the scene light along the optical axis;
   receive the image; and
   reflect the image along the optical axis.

3. The sight system of claim 1, wherein the display is a Digital Light Processing (DLP) display adapted to receive a signal comprising the image, the sight system further comprising:
   a light source adapted to illuminate the DLP display with additional light; and
   wherein the DLP display is adapted to reflect the additional light in a pattern corresponding to the image.

4. The sight system of claim 1, wherein the prism is adapted to rotate the scene light and the image.

5. A sight system comprising:
   an optical system having an optical axis and adapted to receive light from a scene;
   an electronic display adapted to provide an image to the optical system along a first axis different from the optical axis;
   a first light source adapted to illuminate the electronic display to provide the image;
   wherein the optical system is adapted to pass the scene light and the image along the optical axis to superimpose the image on the scene light;
   a prism adapted to receive the superimposed image and the scene light along the optical axis;

a second light source adapted to project additional light into the prism along a second axis different from the optical axis and the first axis to superimpose a reticle on the scene light;

wherein the prism is adapted to pass the superimposed image, the superimposed reticle, and the scene light for viewing by a user of the sight system; and a shutter adapted to substantially prevent the scene light from being viewed by the user while the image and the reticle remain viewable by the user, wherein the image comprises an image of the scene to permit the user to operate the sight system as a telescopic sight.

6. The sight system of claim 1, further comprising a shutter adapted to substantially prevent the scene light from being viewed by the user while the image and the reticle remain viewable by the user, wherein the image comprises information without an image of the scene to permit the user to operate the sight system as an occluded sight.

7. The sight system of claim 1, further comprising a shutter adapted to substantially prevent the scene light and the image from being viewed by the user while the reticle remains viewable by the user to permit the user to operate the sight system as an occluded sight.

8. The sight system of claim 1, wherein the image comprises information received from a sensor.

9. The sight system of claim 5, wherein the image comprises an infrared image of the scene, a thermal image of the scene, or a low light image of the scene received from a camera.

10. The sight system of claim 1, further comprising a processor adapted to generate the image and receive range information to be included in the image, wherein the range information is provided by a laser rangefinder adapted to provide visual feedback to the user for an area of interest in the scene.

11. The sight system of claim 1, wherein the sight system is adapted to be mounted on a firearm.

12. A method of operating a sight system, the method comprising:

receiving light from a scene at an optical system having an optical axis;

providing an image from an electronic display to the optical system along a first axis different from the optical axis, wherein the providing comprises illuminating the electronic display by a first light source;

passing the scene light and the image through the optical system and along the optical axis to superimpose the image on the scene light;

receiving the superimposed image and the scene light along the optical axis by a prism;

projecting, by a second light source, additional light into the prism along a second axis different from the optical axis and the first axis to superimpose a reticle on the scene light;

passing, by the prism, the superimposed image, the superimposed reticle, and the scene light for viewing by a user of the sight system; and wherein the image comprises an infrared image of the scene, a thermal image of the scene, or a low light image of the scene received from a camera.

13. The method of claim 12, wherein the passing the light comprises:

passing the scene light through a beam splitter of the optical system;

receiving the image at the beam splitter; and reflecting the image from the beam splitter to the optical path.

14. The method of claim 12, wherein the display is a Digital Light Processing (DLP) display adapted to receive a signal comprising the image, wherein the providing an image comprises:

illuminating the DLP display with additional light from a light source of the sight system; and reflecting from the DLP display the additional light in a pattern corresponding to the image.

15. The method of claim 12, further comprising rotating the scene light and the image using the prism.

16. A method of operating a sight system, the method comprising:

receiving light from a scene at an optical system having an optical axis;

providing an image from an electronic display to the optical system along a first axis different from the optical axis, wherein the providing comprises illuminating the electronic display by a first light source;

passing the scene light and the image through the optical system and along the optical axis to superimpose the image on the scene light;

receiving the superimposed image and the scene light along the optical axis by a prism;

projecting, by a second light source, additional light into the prism along a second axis different from the optical axis and the first axis to superimpose a reticle on the scene light;

passing, by the prism, the superimposed image, the superimposed reticle, and the scene light for viewing by a user of the sight system; and operating a shutter to substantially prevent the scene light from being viewed by the user while the image and the reticle remain viewable by the user, wherein the image comprises an image of the scene to permit the user to operate the sight system as a telescopic sight.

17. The method of claim 12, further comprising operating a shutter to substantially prevent the scene light from being viewed by the user while the image and the reticle remain viewable by the user, wherein the image comprises information without an image of the scene to permit the user to operate the sight system as an occluded sight.

18. The method of claim 12, further comprising operating a shutter to substantially prevent the scene light and the image from being viewed by the user while the reticle remains viewable by the user to permit the user to operate the sight system as an occluded sight.

19. The method of claim 12, wherein the image comprises information received from a sensor.

20. The method of claim 16, wherein the image comprises an infrared image of the scene, a thermal image of the scene, or a low light image of the scene received from a camera.

21. The method of claim 12, further comprising receiving range information to be included in the image, wherein the range information is provided by a laser rangefinder adapted to provide visual feedback to the user for an area of interest in the scene.

22. The method of claim 12, wherein the sight system is adapted to be mounted on a firearm.

* * * * *